US008072634B2

(12) United States Patent
Yanagi et al.

(10) Patent No.: US 8,072,634 B2
(45) Date of Patent: Dec. 6, 2011

(54) LOCATION INFORMATION MANAGEMENT DEVICE, DATA OUTPUT SYSTEM, AND PROGRAM

(75) Inventors: Satoru Yanagi, Aichi (JP); Masaaki Hibino, Mie (JP); Sunao Kawai, Aichi (JP)

(73) Assignee: Brother Kogyo Kabushiki Kaisha, Aichi (JP)

( * ) Notice: Subject to any disclaimer, the term of this patent is extended or adjusted under 35 U.S.C. 154(b) by 1286 days.

(21) Appl. No.: 11/730,034

(22) Filed: Mar. 29, 2007

(65) Prior Publication Data

US 2007/0229891 A1    Oct. 4, 2007

(30) Foreign Application Priority Data

Mar. 31, 2006  (JP) ................................. 2006-098059

(51) Int. Cl.
*G06F 3/12* (2006.01)
*G06K 15/00* (2006.01)
(52) U.S. Cl. ...................... 358/1.15; 358/1.14
(58) Field of Classification Search .................. 358/1.1, 358/1.8, 1.12, 1.13, 1.15, 1.18, 468; 709/201, 709/205, 223, 226, 238; 707/667, 672, 821
See application file for complete search history.

(56) References Cited

U.S. PATENT DOCUMENTS

| | | | |
|---|---|---|---|
| 6,799,212 B1 | 9/2004 | Iyoki | |
| 6,804,018 B1 * | 10/2004 | Mochizuki | ................... 358/1.14 |
| 7,336,381 B2 * | 2/2008 | Nakajima | ................... 358/1.15 |
| 2001/0029531 A1 | 10/2001 | Ohta | |
| 2002/0184304 A1 | 12/2002 | Meade, II et al. | |
| 2003/0065766 A1 * | 4/2003 | Parry | .............................. 709/224 |
| 2007/0041051 A1 * | 2/2007 | Tanaka | ........................ 358/1.18 |

FOREIGN PATENT DOCUMENTS

| | | |
|---|---|---|
| JP | 11-184660 | 7/1999 |
| JP | 11-203092 | 7/1999 |
| JP | 2000-347827 A | 12/2000 |
| JP | 2002-73318 A | 3/2002 |
| JP | 2003-288193 A | 10/2003 |

* cited by examiner

*Primary Examiner* — Gabriel Garcia
(74) *Attorney, Agent, or Firm* — Scully, Scott, Murphy & Presser, PC

(57) ABSTRACT

A location information management device comprises an output device information receipt unit receiving output device identification information and output device location information, a terminal device information receipt unit receiving terminal device identification information and terminal device location information, and a correspondence setting unit which specifies a data output device having a predetermined location relationship with a communication terminal device and associating the output device identification information with the terminal device identification information, a terminal identification information transmission unit transmitting the terminal device identification information, a first output data receipt unit receiving the terminal device identification information and output data, a first output data transmission unit specifying the output device identification information corresponding to the terminal device identification information and transmitting the output data and a specific state notice request; a first state notice receipt unit receiving a specific state notice, and a first state notice transmission unit transmitting the specific state notice to a communication terminal device.

13 Claims, 17 Drawing Sheets

| USER | PRINTER |
|------|---------|
| USER A | PRINTER 1 |
| USER B | PRINTER 2 |
| USER C | PRINTER 3 |

FIG.9A

| PRINTING REQUEST DATA |
|---|
| PRINTING DATA (PDF, JPEG, A VARIETY OF EMULATED INFORMATION) ※ INCLUDING INFORMATION ON NUMBER OF PAPERS TO BE PRINTED |
| TARGET USER |
| HIGH/LOW |

FIG.9B

| SPECIFIC STATE REACHING NOTICE REQUEST |
|---|
| NOTICE CONTENT (PRINTING START/PRINTING TERMINATION/ SPECIFIC NUMBER OF PAPERS PRINTING+TARGET NUMBER OF PAPERS TO BE PRINTED) |

FIG.9C

| USER DEVICE | USER |
|-------------|------|
| USER DEVICE A | USER A |
| USER DEVICE B | USER B |
| USER DEVICE C | USER C |

FIG.9D

LOCATION INFORMATION MANAGEMENT DEVICE, DATA OUTPUT SYSTEM, AND PROGRAM

CROSS-REFERENCE TO RELATED APPLICATION

This application claims priority under 35 U.S.C. §119 from Japanese Patent Application No. 2006-098059, filed on Mar. 31, 2006. The entire subject matter of the application is incorporated herein by reference.

BACKGROUND

1. Technical Field

Aspects of the present invention relate to technology for outputting data.

2. Related Art

There have been data output devices which output data received from a terminal device via networks, one of which obtains location information which shows location of the data output device and transmits the obtained location information to the terminal device via the networks. Japanese Patent Provisional Publication No. 2002-73318A discloses such a device.

According to the data output device, a sender of data (a user of the terminal device) may correctly identify the location where the data is outputted. When outputting the data to other persons, the sender thereby outputs the data to a data output device installed around a receiver of the data (a user receiving the outputted data), and may allow the receiver to easily obtain the outputted data.

SUMMARY

Aspects of the invention are advantageous in that a location information management device capable of outputting data at a location where a receiver exists and allowing the receiver to obtain the data at proper timing.

BRIEF DESCRIPTION OF THE ACCOMPANYING DRAWINGS

FIGS. 9A to 9D are explanatory drawings illustrating printing destination user list, printing request data, specific state reaching notice request, and a user device table.

DETAILED DESCRIPTION

General Overview

Figure 1:
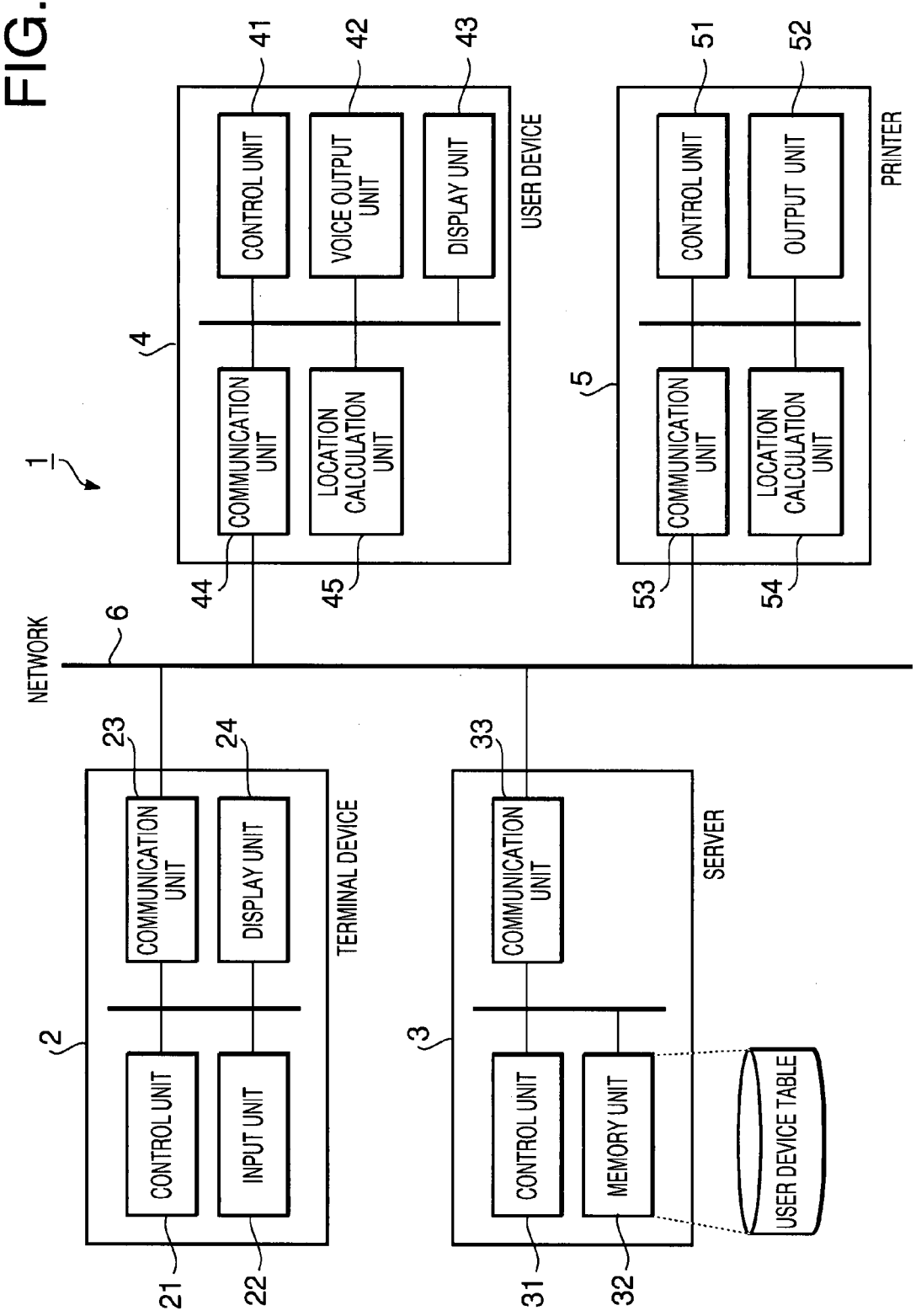
FIG. 1 is a configuration block diagram of a data output system 1 in accordance with a first embodiment of the present invention.

It is noted that various connections are set forth between elements in the following description. It is noted that these connections in general and unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

According to an aspect of the invention, there is provided a location information management device for use with at least one data output device, at least one communication terminal device and at least one information processing device. The location information management device comprises: an output device information receipt unit which receives output device identification information for identifying the at least one data output device and output device location information which shows a location of the at least one data output device from the at least one data output device; a terminal device information receipt unit which receives terminal device identification information for identifying the at least one communication terminal device and terminal device location information which shows a location of the at least one communication terminal device from the at least one communication terminal device; and a correspondence setting unit which specifies the at least one data output device having a predetermined location relationship with the at least one communication terminal device based on relation between the output device identification information and the output device location information received by the output device information receipt unit and the terminal device identification information and the terminal device location information received by the terminal device information receipt unit, stores the output device identification information of a specified data output device and the terminal device identification information of a corresponding communication terminal device with which the specified data output device has the predetermined location relationship, in a storage unit, while associating the output device identification information with the terminal device identification information.

Further, the location information management device comprises: a terminal identification information transmission unit which transmits the terminal device identification information stored in the storage unit to the at least one information processing device; a first output data receipt unit which receives the terminal device identification information and output data to be outputted by a data output device from the information processing device; a first output data transmission unit which specifies the output device identification information corresponding to the terminal device identification information received by the first output data receipt unit in accordance with the output device identification information and the terminal device identification information associated with each other in the storage unit, and transmits the output data and a specific state notice request designating a specific state which should be notified by the data output device regarding output of the output data, to the data output device indicated by the specified output device identification information; a first state notice receipt unit which receives a specific state notice indicating that output of the output data has reached the specific state, from the data output device; and a first state notice transmission unit which transmits the specific state notice to a communication terminal device represented by the terminal device identification information received by the first output data receipt unit.

According to the location information management device, first, the output device information receipt unit receives the output device identification information and the output device location information from the data output device, and the terminal device information receipt unit receives the terminal device identification information and the terminal device location information from the communication terminal device.

Subsequently, the correspondence setting unit specifies the data output device having location relation designated previously for the communication terminal device from relation between the output device identification information and the output device location information received by the output device information receipt unit, and the terminal device identification information and the terminal device location information received by the terminal device information receiving unit, combines the output device identification information of the specified data output device and the terminal device identification information of the communication terminal device which correspond to each other, and stores them in a memory area, and the terminal identification information transmission unit transmits the terminal device identification information stored in the memory area by the correspondence setting unit to the information processing device.

Then, the first output data receipt unit receives the terminal device identification information and the output data from the information processing device. The first output data transmission unit specifies the output device identification information corresponding to the terminal device identification information received by the first output data receipt unit according to the content stored in the memory area, and transmits the output data and the specific state notice request to the data output device showed by the specified output device identification information.

After that, when the first state notice receipt unit receives the specific state notice from the data output device, the first state notice transmission unit transmits the specific state notice to the communication terminal device showed by the terminal device identification information received by the first output data receipt unit.

And, in the data output device, first, the output device location information obtaining unit obtains the output device location information of the data output device, and the output device information transmission unit transmits the output device location information obtained by the output device location information obtaining unit and the output device identification information of the data output device to the location information management device.

After that, when the second output data receipt unit receives the output data and the specific state notice request from the location information management device, the data output unit outputs the output data received by the second output data receipt unit.

Then, the second state notice transmission unit transmits the specific state notice to the location information management device on condition that the specific state designated by the specific state notice request received by the second output data receipt unit has been reached regarding output of the output data by the data output unit.

Therefore, according to the above mentioned configuration, by previously designating location relation corresponding to the receiver of the output data, designating a proper timing for the receiver to obtain the output data in the specific state, and allowing the receiver to use the communication terminal device, the output data can be outputted at the place corresponding to the receiver, and also the receiver is able to obtain the output data at the proper timing.

In at least one aspect, the location information management device further comprises: an amount of data determination unit which determines an amount of the output data received by the first output data receipt unit; and a first specific state setting unit which sets the specific state designated by the specific state notice request to an output start state of the output data if a determination result of the amount of data determination unit is less than a predetermined first amount of data.

With this configuration, the receiver is able to quickly obtain the output data when amount of the output data is less than the first amount of data, and output of the output data is quickly completed.

In at least one aspect, the location information management device further comprises: an amount of data determination unit which determines an amount of the output data received by the first output data receipt unit; and a second specific state setting unit which sets the specific state designated by the specific state notice request to an output completion state of the output data if the determination result of the amount of data determination unit is more than a predetermined first amount of data.

With this configuration, it is possible to prevent the receiver from waiting near the data output device until completion of the output and wasting time when amount of the output data is more than the first amount of data, and much time is required to complete the output.

In at least one aspect, the location information management device further comprises: an amount of data determination unit which determines an amount of the output data received by the first output data receipt unit; a first specific state setting unit which sets the specific state designated by the specific state notice request to an output start state of the output data if a determination result of the amount of data determination unit is less than a predetermined first amount of data; a third specific state setting unit which sets the specific state designated by the specific state notice request to such a state that an amount of output of the output data has reached a predetermined amount of data if the determination result of the amount of data determination unit is larger than or equal to the first amount of data and is less than a predetermined second amount of data; and a fourth specific state setting unit which sets the specific state designated by the specific state notice request to an output completion state of the output data if the determination result of the amount of data determination unit is larger than or equal to the second amount of data.

With this configuration, the receiver is able to quickly obtain the output data when amount of the output data is less than the first amount of data, and output of the output data may be quickly completed. Further, it is possible to prevent the receiver from waiting near the data output device until completion of the output and wasting time when amount of the output data is more than the second amount of data, and much time is required to complete the output. Further, if the amount of the output data is larger than or equal to the first amount of data and is less than the second amount of data, the receiver is able to go to obtain the output data when amount of output of the output data has reached designated amount of data.

In at least one aspect, the location information management device further comprises: a fifth specific state setting unit which judges whether the output data received by the first output data receipt unit has been set to be secret, and sets the specific state designated by the specific state notice request to an output start state of the output data if the output data is secret.

With this configuration, it is possible to allow the receiver to quickly obtain the output data, and to prevent any other persons from finding the output data when the output data which is secret from any other persons is outputted.

In at least one aspect the location information management device further comprises: a terminal location request transmission unit which transmits a terminal location request to the communication terminal device a plurality of times; a location change specifying unit which specifies the terminal device identification information corresponding to the terminal device location information which changed within a first predetermined time according to the terminal device identification information and the terminal device location information received by the terminal device information receipt unit; and an exclusion unit which excludes the terminal device identification information specified by the location change specifying unit from an storing object to be stored in the storage unit by the correspondence setting unit.

Because the communication terminal device which has moved within the first designated time is excluded from the storing object, it is possible to prevent the output data from being outputted to the receiver who is moving or frequently moves.

In at least one aspect, the location information management device further comprises: an output identifier setting unit which sets an output identifier to the output data to be transmitted by the first output data transmission unit; an identity determination unit which judges whether or not the terminal device identification information associated with the output device identification information corresponding to a receiver of first output data in the storage unit and the terminal device identification information associated with to the output device identification information corresponding to a receiver of second output data in the storage unit are identical with each other if the first output data transmission unit transmits the second output data before the first state notice receipt unit receives the specific state notice, in response to a fact that the first output data transmission unit transmitted the first output data; and a suspension request transmission unit which transmits the output identifier for output of the first output data and a notice suspension request to the data output device if a determination result of the identity determination unit shows that the terminal device identification information are identical with each other.

When the second output data is outputted following the first output data for the identical receiver, because the specific state notice for output of the first output data is suspended to be transmitted, and only the specific state notice for output of the second output data is transmitted, it is possible to prevent this receiver from repeating to go to obtain the output data.

According to another aspect of the invention, there is provided a data output system which comprises: a location information management device which has the above mentioned configuration; at least one data output device; at least one communication terminal device; and at least one information processing device. In this data output system, the at least one data output device comprises: a output device location information obtaining unit which obtains the output device location information of the data output device; a output device information transmission unit which transmits the output device location information obtained by the output device location information obtaining unit and the output device identification information of the data output device to the location information management device; a second output data receipt unit which receives the output data and the specific state notice request from the location information management device; a data output unit which outputs the output data received by the second output data receipt unit; and a second state notice transmission unit which transmits the specific state notice to the location information management device in response to a fact that the specific state designated by the specific state notice request received by the second output data receipt unit has been reached regarding output of the output data by the data output unit.

In the data output system, the at least one communication terminal device comprises: a terminal device location information obtaining unit which obtains the terminal device location information of the communication terminal device; a terminal device information transmission unit which transmits the terminal device location information obtained by the terminal device location information obtaining unit and the terminal device identification information of the communication terminal device to the location information management device; a second state notice receipt unit which receives the specific state notice from the location information management device; and a state notice output unit which outputs such a fact that the specific state notice has been received by the second state notice receipt unit.

In the data output system, the at least one information processing device comprises: a terminal identification information receipt unit which receives the terminal device identification information from the location information management device; a selection unit which selects a notice receiver to which output of the output data is notified from the terminal device identification information received by the terminal identification information receipt unit; and a second output data transmission unit which transmits the terminal device identification information of the notice receiver selected by the selection unit and the output data to the location information management device.

According to the above mentioned configuration, in the communication terminal device, first, the terminal device location information obtaining unit obtains the terminal device location information, and the terminal device information transmission unit transmits the terminal device location information obtained by the terminal device location information obtaining unit and the terminal device identification information of the communication terminal device to the location information management device.

Then, when the second state notice receipt unit receives the specific state notice from the location information management device, the state notice output unit outputs such a fact that the specific state notice has been received by the second state notice receipt unit.

And, in the information processing device, first, the terminal identification information receipt unit receives the terminal device identification information from the location information management device. Then, the selection unit selects the notice receiver to which output of the output data is noticed from the terminal device identification information received by the terminal identification information receipt unit, and the second output data transmission unit transmits the terminal device identification information of the notice receiver selected by the selection unit and the output data to the location information management device.

That is, in this data output system, when the information processing device selects the communication terminal device to which output of the output data is noticed and transmits the output data to the location information management device, the location information management device transmits the output data to the data output device having location relation designated previously for the communication terminal device selected by the information processing device, and this data output device outputs the output data. Then, when output of the output data reaches the specific state, the data output device transmits the specific state notice to the location information management device, the location information management device transmits the specific state notice to the communication terminal device selected by the information processing device, and this communication terminal device outputs such a fact that it has received the specific state notice.

Therefore, according to the data output system, by previously designating location relation corresponding to the receiver of the output data, designating a proper timing for the receiver to obtain the output data in the specific state, and allowing the receiver to use the communication terminal device, the output data can be outputted at the place corresponding to the receiver, and also the receiver is able to obtain the output data at the proper timing.

In at least one aspect, the communication terminal device is installed in a user-portable device.

When the communication terminal device is configured as the above, even if the receiver moves, the data can be outputted at the place corresponding to the receiver, and also the receiver is able to obtain the data at the proper timing.

In at least one aspect, the information processing device further comprises a secret setting unit which sets information on whether or not the output data is secret, to the output data.

In at least one aspect, the communication terminal device further comprises: a terminal location request receipt unit which receives terminal location request requiring transmission of the terminal device location information from the location information management device; and an operation unit which operates the terminal device location information obtaining unit and the terminal device information transmission unit in response to receipt of the terminal location request by the terminal location request receipt unit.

In at least one aspect, the data output device further comprises: a suspension request receipt unit which receives an output identifier identifying output of the output data and a notice suspension request requesting transmission suspension of the specific state notice from the location information management device; and a notice suspension unit which causes the second state notice transmission unit to suspend transmission of the specific state notice for output of the output data indicated by the output identifier received by the suspension request receipt unit.

According to another aspect of the invention, there is provided a computer readable medium having computer readable instruction stored thereon, which, when executed by a processor of a location information management device for use with at least one data output device, at least one communication terminal device and at least one information processing device, configures the processor to perform the steps of: receiving output device identification information for identifying the at least one data output device and output device location information which shows a location of the at least one data output device from the at least one data output device; receiving terminal device identification information for identifying the at least one communication terminal device and terminal device location information which shows a location of the at least one communication terminal device from the at least one communication terminal device; specifying the at least one data output device having a predetermined location relationship with the at least one communication terminal device based on relation between the output device identification information and the output device location information, and the terminal device identification information and the terminal device location information; and storing the output device identification information of a specified data output device and the terminal device identification information of a corresponding communication terminal device with which the specified data output device has the predetermined location relationship, in a storage unit, while associating the output device identification information with the terminal device identification information.

Further, the instruction configures the processor to the steps of: transmitting the terminal device identification information stored in the storage unit to the at least one information processing device; receiving the terminal device identification information and output data to be outputted by a data output device from the information processing device; specifying the output device identification information corresponding to the received terminal device identification information in accordance with the output device identification information and the terminal device identification information associated with each other in the storage unit; transmitting the output data and a specific state notice request designating a specific state which should be notified by the data output device regarding output of the output data, to the data output device indicated by the specified output device identification information; receiving a specific state notice indicating that output of the output data has reached the specific state, from the data output device; and transmitting the specific state notice to a communication terminal device represented by the received terminal device identification information.

Therefore, according to the above mentioned configuration, by previously designating location relation corresponding to the receiver of the output data, designating a proper timing for the receiver to obtain the output data in the specific state, and allowing the receiver to use the communication terminal device, the output data can be outputted at the place corresponding to the receiver, and also the receiver is able to obtain the output data at the proper timing.

EMBODIMENT

The embodiments of the present invention will be described below along with the drawings.

First Embodiment

First, FIG. 1 is a block diagram of a data output system 1 according to a first embodiment. As illustrated in FIG. 1, the data output system 1 includes a terminal device 2, a server 3, a user device 4, and a printer 5, which are connected to a network 6. Although in FIG. 1 one terminal device 2, one server 3, one user device 4, and one printer 5 are illustrated for the sake of simplicity, a plurality of terminal devices 2, one server 3, a plurality of user devices 4, and a plurality of printers 5 are connected to the network 6 in the data output system 1.

The terminal device 2 includes a control unit 21, an input unit 22, a communication unit 23, and a display unit 24, and is configured as a personal computer operated by users. More specifically, the control unit 21 includes a CPU, ROM, RAM, a hard disk device, and the CPU controls each unit of the terminal device 2 according to programs stored in the ROM and the hard disk device.

The input unit 22 includes operation devices, such as a keyboard, and a pointing device, to output operation signals to the control unit 21 according to user's operations. The communication unit 23 is connected to the network 6 to transmit and receive data between the control unit 21 and the network 6. The display unit 24 is, for example, a liquid crystal monitor to display images according to indications from the control unit 21. The server 3 includes a control unit 31, a memory unit 32, and a communication unit 33.

More specifically, the control unit 31 includes a CPU, ROM, RAM, and the CPU controls each unit of the server 3 according to programs stored in the ROM and the memory unit 32.

The memory unit 32 is, for example, a hard disk device, to store a variety of programs and user device tables which will be explained later. The communication unit 33 is connected to the network 6 to transmit and receive data between the control unit 31 and the network 6. The user device 4 includes a control unit 41, a voice output unit 42, a display unit 43, a communication unit 44, and a location calculation unit 45 to be installed in a user-portable device (e.g. a mobile phone).

More specifically, the control unit 41 includes a CPU, ROM, RAM, and the CPU controls each unit of the user device 4 according to programs stored in the ROM. The voice output unit 42 outputs voice to the outside according to indications from the control unit 21.

The display unit 43 is, for example, a liquid crystal display monitor to display images according to indications from the control unit 41. The communication unit 44 is connected to the network 6 to transmit and receive data between the control unit 41 and the network 6. The communication unit 44, however, is connected by wireless to the network 6.

The location calculation unit 45 calculates location of the user device 4 by receiving and processing electric waves transmitted from the GPS (Global Positioning System) satellites according to requests from the control unit 41, and outputs location information which shows the calculated location to the control unit 41. The printer 5 includes a control unit 51, an output unit 52, a communication unit 53, and a location calculation unit 54. More specifically, the control unit 51 includes a CPU, ROM, RAM, and the CPU controls each unit of the printer 5 according to programs stored in the ROM.

The output unit 52 prints on papers for the printing according to indications from the control unit 21. The communication unit 53 is connected to the network 6 to transmit and receive data between the control unit 51 and the network 6. The location calculation unit 54 calculates location of the printer 5 by receiving and processing electric waves transmitted from the GPS satellites according to requests from the control unit 51, and outputs location information which shows the calculated location to the control unit 51. Meanwhile, these devices of the data output system 1 complies with the specifications of UPnP (Universal Plug and Play).

Figure 2:
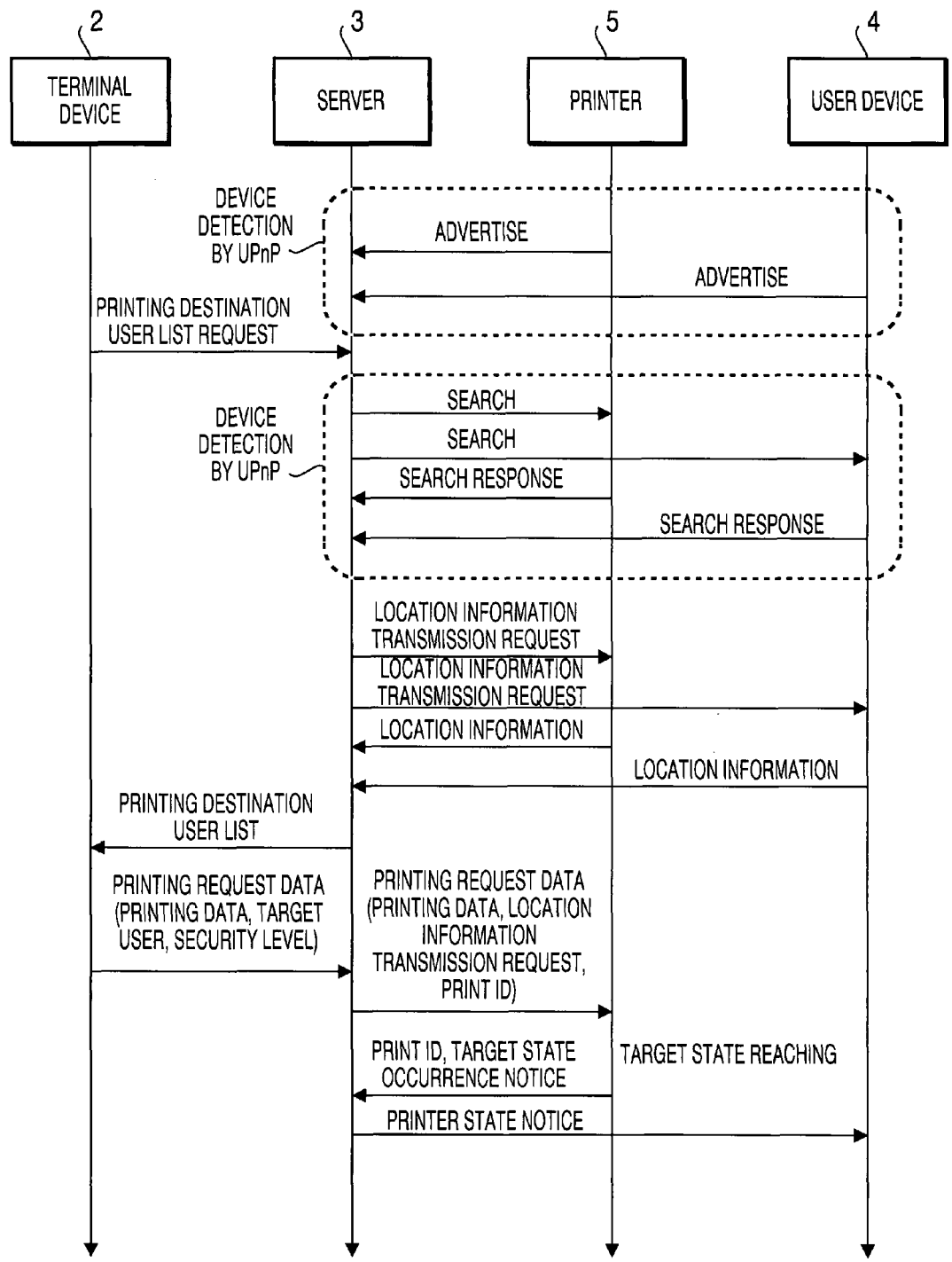
FIG. 2 is a sequence diagram illustrating a flow of communications between devices of the data output system 1 in accordance with the first embodiment of the present invention.
Figure 3:
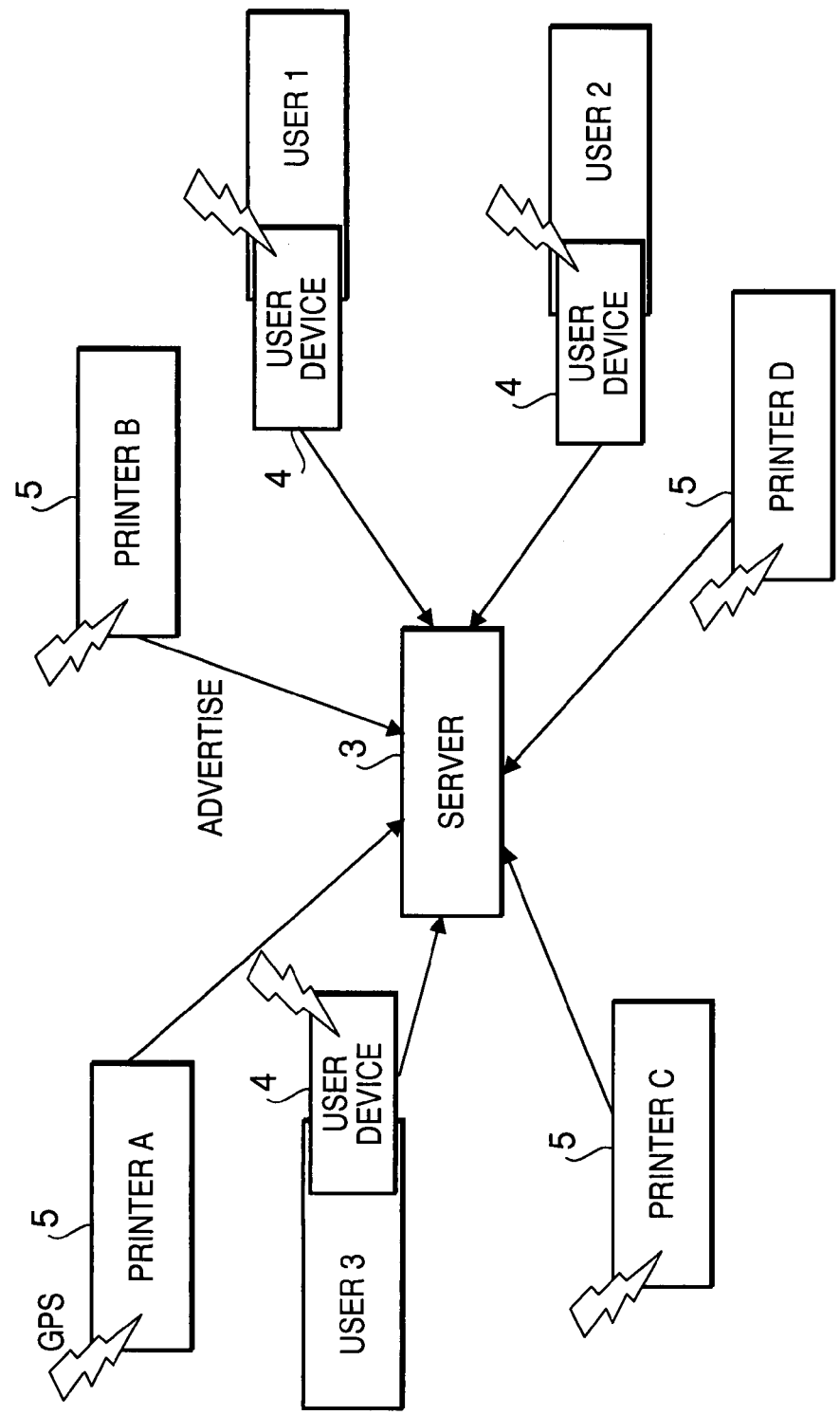
FIG. 3 is an explanatory drawing illustrating state of the data output system 1 for transmitting Advertise.

FIG. 2 is a sequence diagram showing a communication flow between the devices of the data output system 1. As shown in FIG. 2, when power is applied to the printers 5 and the user devices 4, respectively, the server 3 receives notices (Advertise) showing such a fact that these devices exist on the network 6 from these devices, and detects the printers 5 and the user devices 4 (see FIG. 3).

Figure 4:
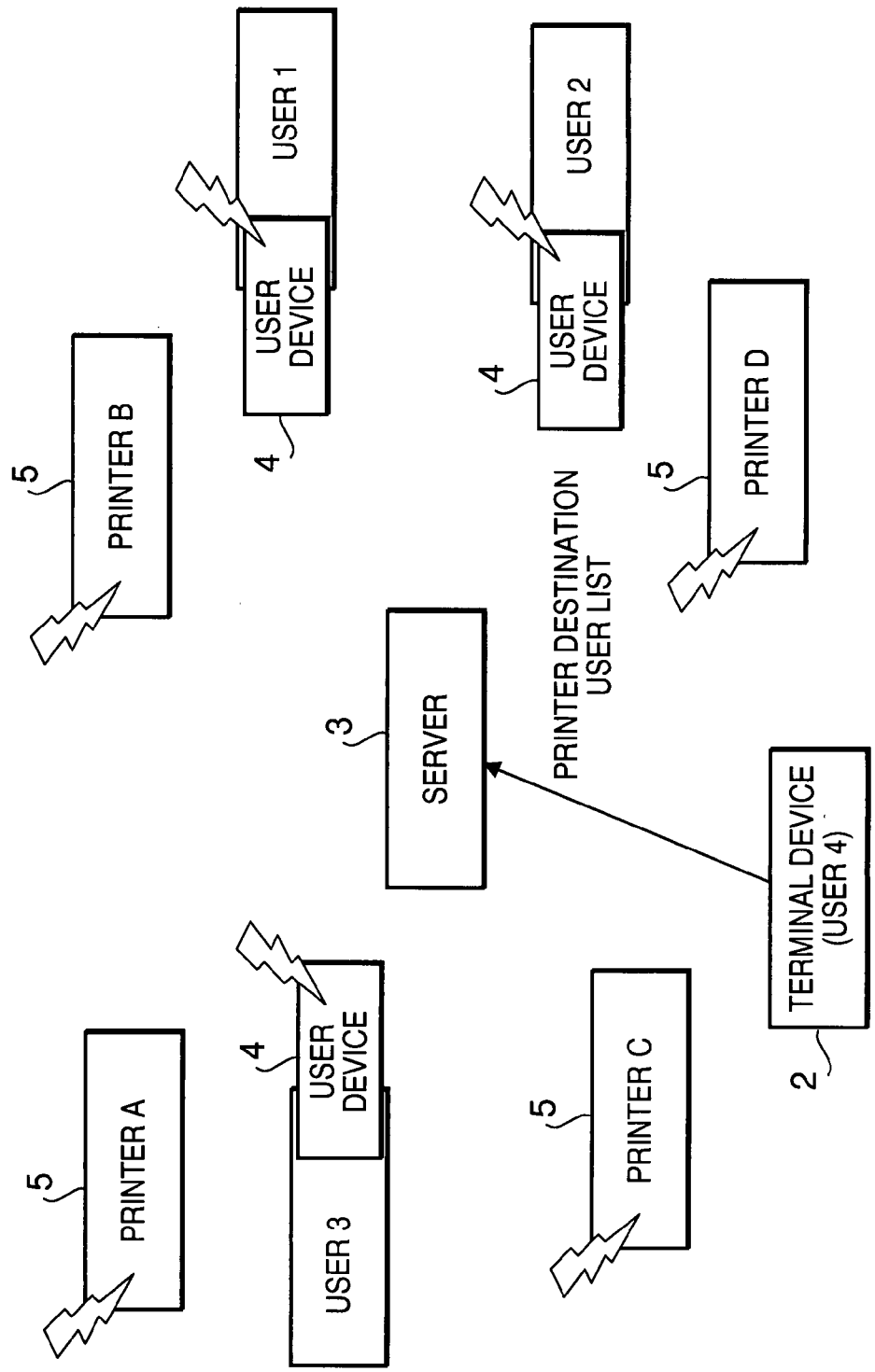
FIG. 4 is an explanatory drawing illustrating state of the data output system 1 for transmitting printing destination user list request.

After that, when receiving printing destination user list request which requires a use's list for printing destination (printing destination user list) from the terminal device 2 (see FIG. 4), the server 3 searches for the printers 5 and the user devices 4 which are connected to the network 6, and receives responses (search responses) from these devices. The server 3, thereby, detects the printers 5 and the user devices 4 again.

Figure 5:
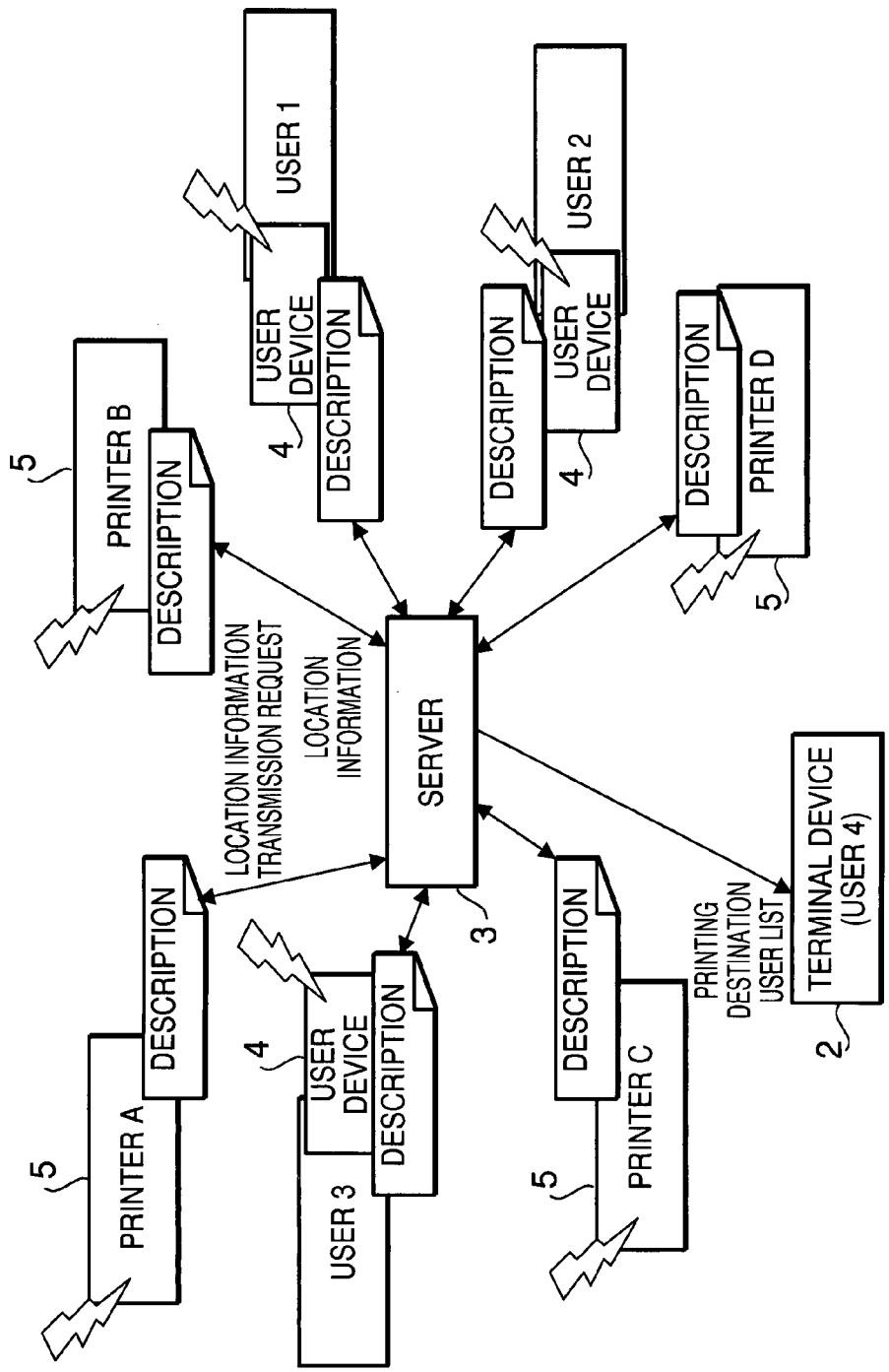
FIG. 5 is an explanatory drawing illustrating state of the data output system 1 for transmitting location information transmission request.

Subsequently, the server 3 transmits location information transmission request which requires transmission of the above location information to the printers 5 and the user devices 4, then receives location information on these devices from these devices (see FIG. 5). The server 3, thereby, generates the printing destination user list based on the received location information, and transmits the generated printing destination user list to the terminal device 2.

Figure 6:
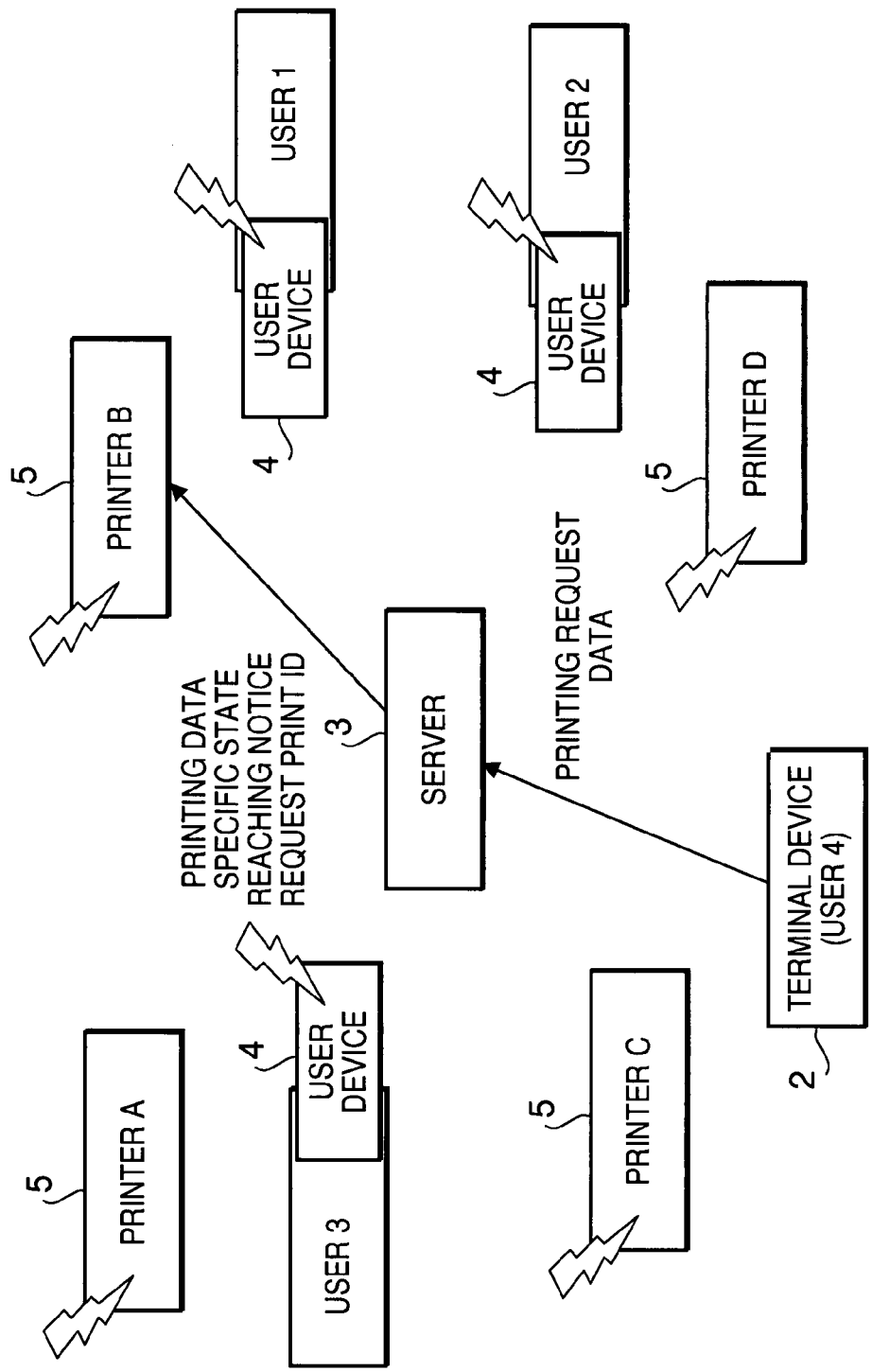
FIG. 6 is an explanatory drawing illustrating state of the data output system 1 for transmitting printing request data.

When receiving printing request data which includes printing data, target users for the printing destination, and security levels for the printing data from the terminal device 2, the server 3 transmits to the printer 5 the printing data, a specific state reaching notice request which designates a specific state which should be noticed by the printer 5 regarding the printing, and a print ID which is a identifier to identify a printing job (see FIG. 6).

Figure 7:
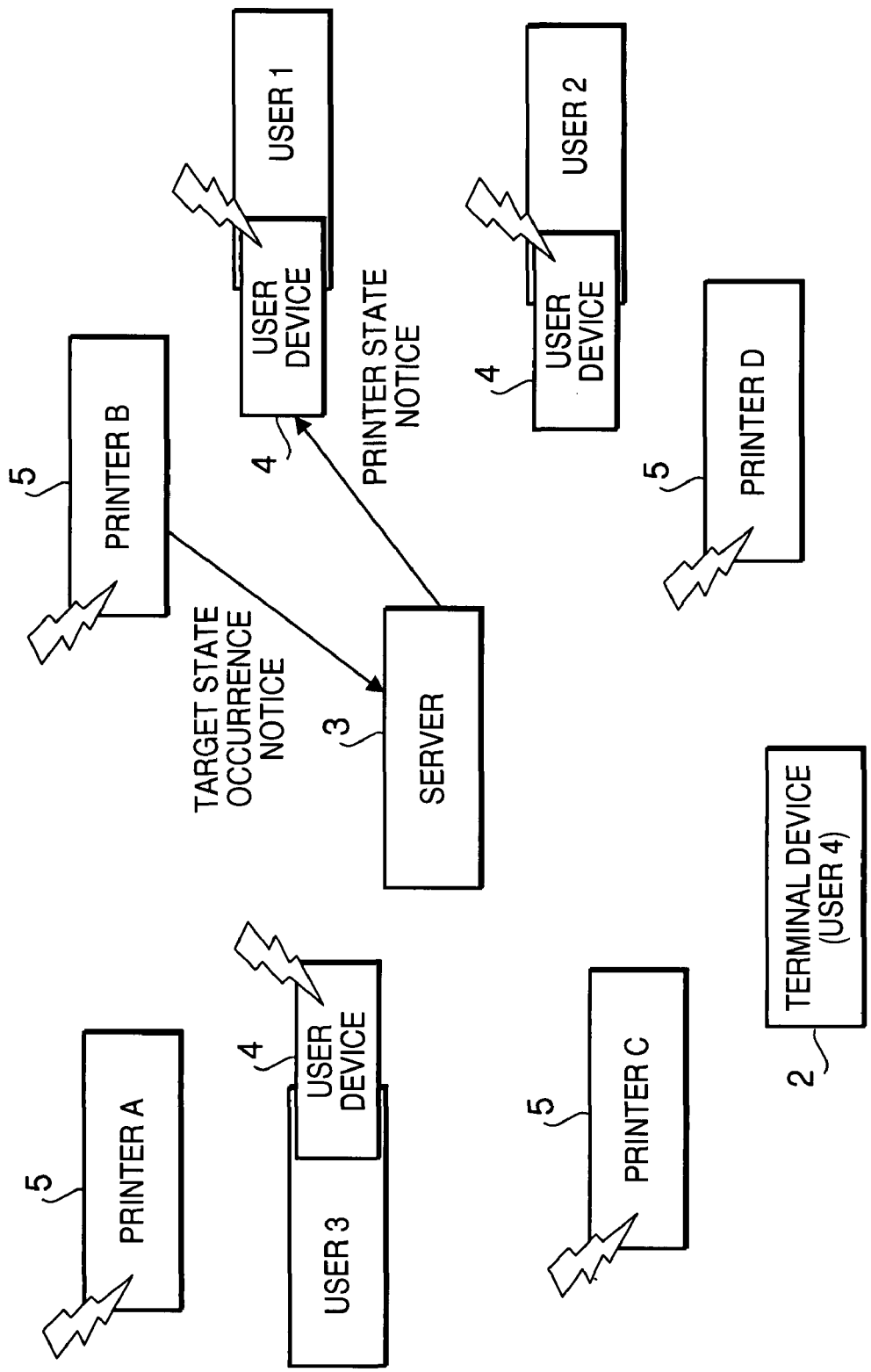
FIG. 7 is an explanatory drawing illustrating state of the data output system 1 for transmitting target state occurrence notice.

After that, when the printing of the printer 5 has reached the specific state (notice target state) designated by the specific state reaching notice request, and the server 3 has received a target state occurrence notice which shows such a fact that the notice target state has been reached and the print ID from the printer 5, the server 3 transmits a printer state notice which notices such a fact that the printer 5 has reached the specific state to the user device 4 (see FIG. 7).

A variety of processes which are executed for the above communications by the terminal device 2, the server 3, the user device 4, and printer 5, respectively, will be described below in detail.

Figure 8:
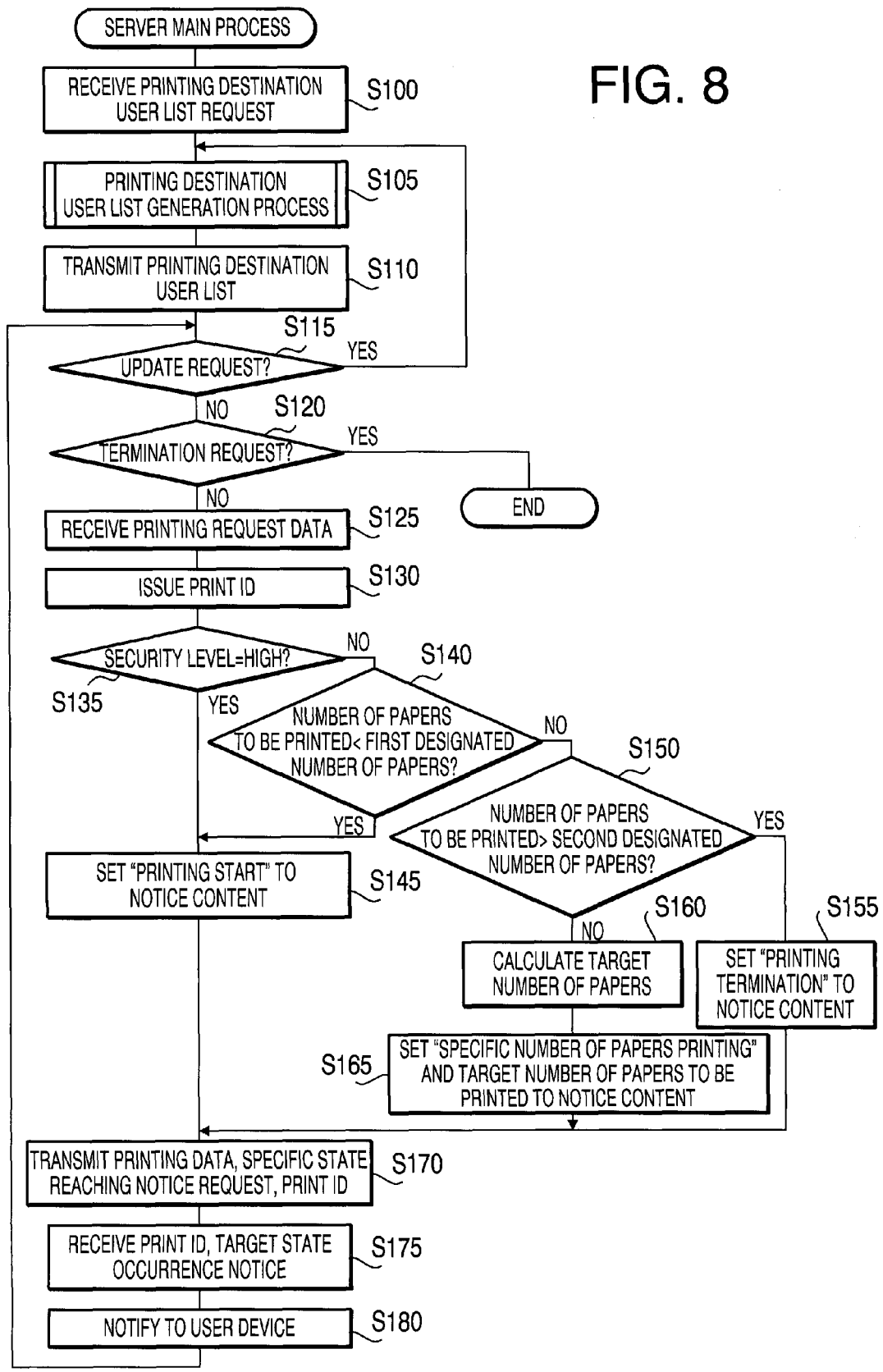
FIG. 8 is a flowchart illustrating a flow of a server main process in accordance with the first embodiment of the present invention.

First, FIG. 8 is a flowchart which shows a flow of a server main process executed by the control unit 31 of the server 3. Meanwhile, the control unit 31 executes this process when receiving the printing destination user list request from the printer 2. As shown in FIG. 8, in this process, first, the printing destination user list request is received (step S100), then a printing destination user list generation process which generates the printing destination user list and will be explained later is executed (S105).

After the printing destination user list generation process, the generated printing destination user list (see FIG. 9A) is transmitted to the terminal device 2 which transmits the printing destination user list request (S110), then it is determined whether or not an update request of the printing destination user list has been received from this terminal device 2 (S115).

If the update request has been received (S115: Yes), control returns to step S105. If the update request has not been received (S115: No), it is determined whether or not a termination request which requires termination of the printing has been received from this terminal device 2 (S120).

If the termination request has been received (S120: Yes), the process terminates. If the termination request has not been received (S1120: No), printing request data (see FIG. 9B) is received from this terminal device 2 (S125). After the printing request data has been received, a print ID is issued to the printing data included in the printing request data (S130), and then it is determined whether or not security level included in the printing request data is "high" which means that the printing data is secret (S135).

If the security level is "high" (S135: Yes), control proceeds to S145 which will be explain later. If the security level is not "high" (i.e., "low") (S135: No), it is determined whether or not the number of sheets of paper to be printed for the printing data is less than the first designated number of sheets of paper which is previously designated (20 in the first embodiment) (S140).

If the number of sheets of printed paper is less than the first designated number of sheets of paper (S140: Yes), "printing start" is set to notice content (i.e., a specific state which should be notified by the printer 5) for the specific state reaching notice request (see FIG. 9C), and then control proceeds to step S170 which will be explain later.

On the other hand, if the number of sheets of printed paper is not less than the first designated number of papers (S140: No), it is determined whether or not it is more than the second designated number of sheets of paper which is previously determined (S150). Specifically, the second designated number of sheets of paper is set to be a value (40 in the first embodiment) which is more than the first designated number of sheets of paper.

If the number of sheets of printed paper is more than the second designated number of sheets of paper (S150: Yes), "printing termination" is set to the notice content for the specific state reaching notice request (S155). Then, control proceeds to S170 which will be explain later.

On the other hand, if the number of sheets of printed paper is less than the second designated number of sheets of paper (S150: No), it is number of sheets of paper between the first designated number of sheets of paper and the second designated number of sheets of paper, then the target number of sheets of paper to be printed which should be notified by the printer 5 is calculated (S160). In the first embodiment, specifically, the target number of sheets of paper to be printed is calculated based on a formula: target number of papers to be printed=$\{N \times (N-20)\}/2$, where the number is rounded off to the nearest integer, and N=the number of sheets of paper to be printed.

After the calculation of the target number of sheets of paper to be printed, "specific number of papers printing" and the calculated target number of sheets of paper to be printed are set to the notice content for the specific state reaching notice request (S165). Then, referring to the printing destination user list, the printing data, the specific state reaching notice request, and the print ID are transmitted to the printer 5 which corresponds to the target user included in the printing request data (S170).

After that, when the print ID and the above target state occurrence notice are received from the printer 5 (S175), such a fact that the printer 5 has reached the specific state is notified to the user device 4 by transmitting a printer state notice to the user device 4 which the user corresponding to the printer 5 (that is, a target user) is carrying (S180), and the this process terminates. Meanwhile, at step S175, the user device 4 for the target user is determined based on the user device table (see FIG. 9D) in which the user and the user device 4 are associated with each other.

Figure 10:
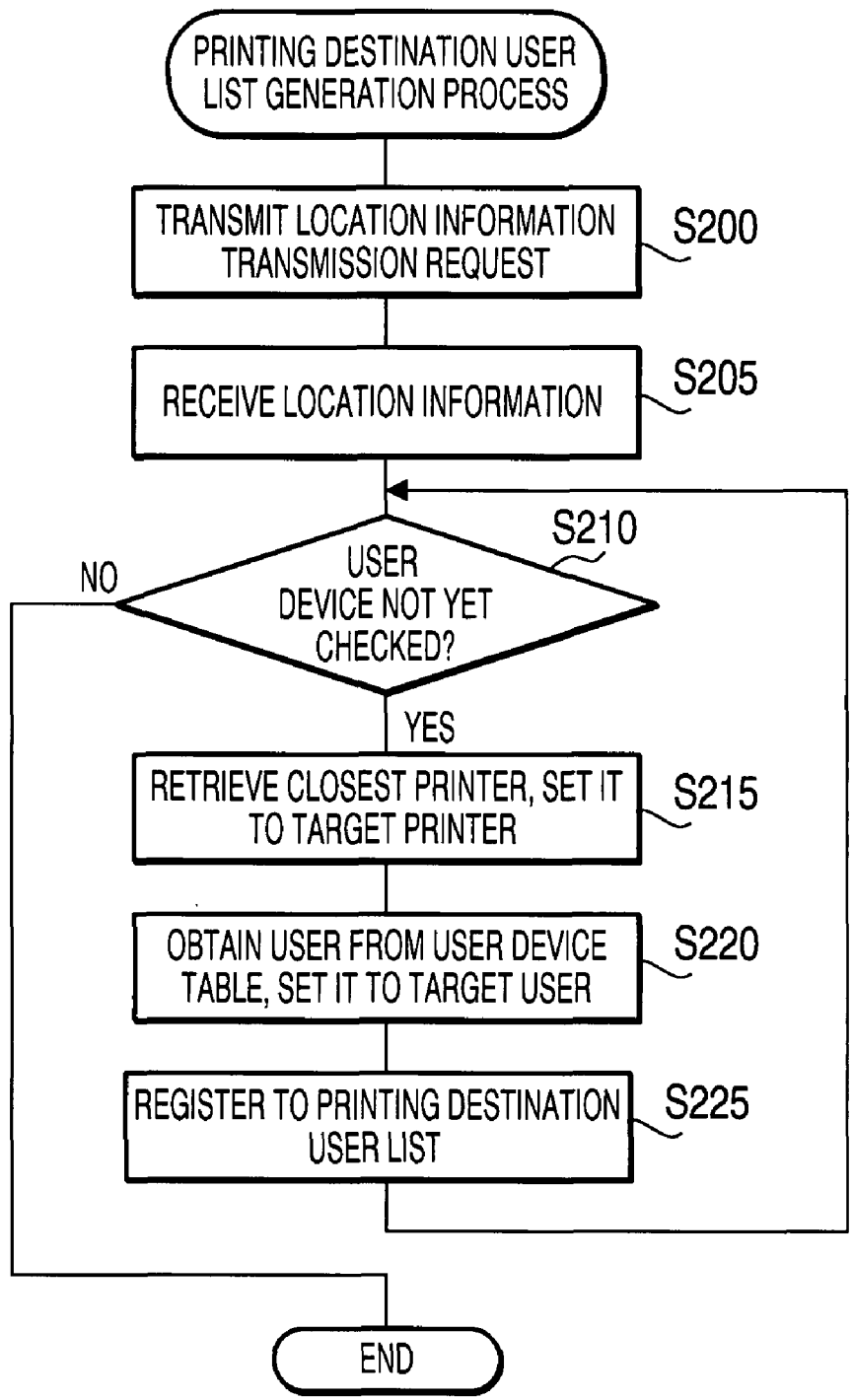
FIG. 10 is a flowchart illustrating a flow of printing destination user list generation process in accordance with the first embodiment of the present invention.

FIG. 10 is a flowchart which shows a flow of the printing destination user list generation process (S105). In the process shown in FIG. 10, first, the location information transmission request is transmitted to all the printers 5 and all the user devices 4 (S200). Then, the location information is received from the printers 5 and the user devices 4 (S205). Further, at S205, the device IDs are received along with the location information to identify the printers 5 and the user devices 4.

Then, it is judged whether or not there are the user devices 4 which received the location information, and have not yet been checked at S215 and S220 which will be explained later (S210). If there are the user devices 4 which have not yet been checked (S210: Yes), the printer 5 which is closest to one of the above user devices 4 is retrieved based on the location information of this user device 4 and the location information of the printer 5. Then, the retrieved printer 5 is set to be a target printer for this user device 4 (S215).

Next, a name of the user who is carrying this user device 4 is obtained from the above user device table (S220), and the name of this user and the device ID of this target printer are combined and registered to the printing destination user list (S225). Then, control returns to S210.

On the other hand, at S210, if there is no user device which has not yet been checked (S210: Yes), this process immediately terminates.

Figure 11:
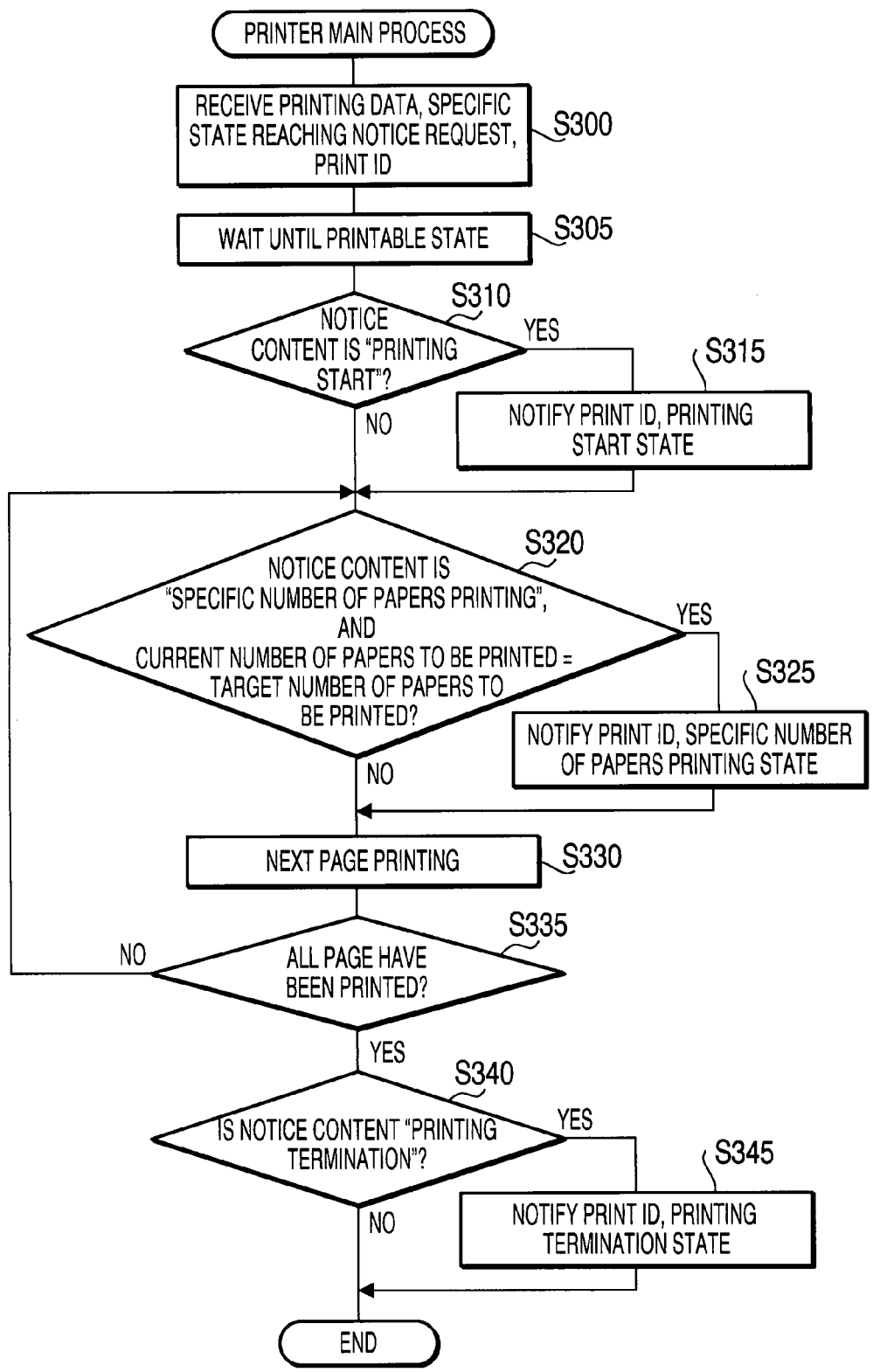
FIG. 11 is a flowchart illustrating a flow of printer main process in accordance with the first embodiment of the present invention.

FIG. 11 is a flowchart which shows a flow of the printer main process which is executed by the control unit 51 of the printer 5.

Meanwhile, when receiving the printing ID, the specific state reaching notice request, and the print ID from the server 3, the control unit 51 executes this process.

In the process shown in FIG. 11, first, the printing data, the specific state reaching notice request, and the print ID are received (S300), Then, the control unit 51 waits until the output unit 52 becomes to be in such a state (printable state) that the printing (output of the printing data) based on this printing data is able to be executed (S305).

When the printing starts, the control unit 51 judges whether or not the notice content of the specific state reaching notice request is set to "printing start" (S310). If the notice content is not set to "printing start" (S310: No), control directly proceeds to step S320 which will be explained later.

If the notice content is set to "printing start" (S310: Yes), the target state occurrence notice which shows such a fact that the printing start state has been reached, and the print ID are transmitted to the server 3 (S315).

In step S320, the control unit 51 judges whether or not the notice content of the specific state reaching notice request is "specific number of papers printing", and also the current number of papers to be printed has reached the target number of papers to be printed. If the notice content is not set to "specific number of papers printing", or if the notice content is set to "specific number of papers printing" and the current number of papers to be printed has not yet reached the target number of sheets of paper to be printed (S320: No), control directly proceeds to step S330 which will be explained later.

On the other hand, if the notice content is "specific number of papers printing", and also the current number of sheets of paper to be printed has reached the target number of sheets of paper to be printed (S320: Yes), the target state occurrence notice which shows such a fact that the specific number of papers printing state has been reached, and the print ID are transmitted to the server 3 (S325).

Then, the printing of the next page is executed (S330). In step S335, the control unit 51 judges whether or not the printing for all the pages showed by the printing data has been completed (S335). If the printing for all the pages has not yet been completed (S335: No), control returns to step S320.

If the printing for all the pages has been completed (S335: Yes), the control unit 51 judges whether or not "printing termination" is set to the notice content of the specific state reaching notice request (S340). If "printing termination" is not set (S340: No), the printer main process terminates.

On the other hand, if the notice content is set to "printing termination" (S340: Yes), the target state occurrence notice which shows such a fact that the printing termination state has been reached, the print ID are transmitted to the server 3 (S345). Then, the printer main process terminates.

Figure 12:
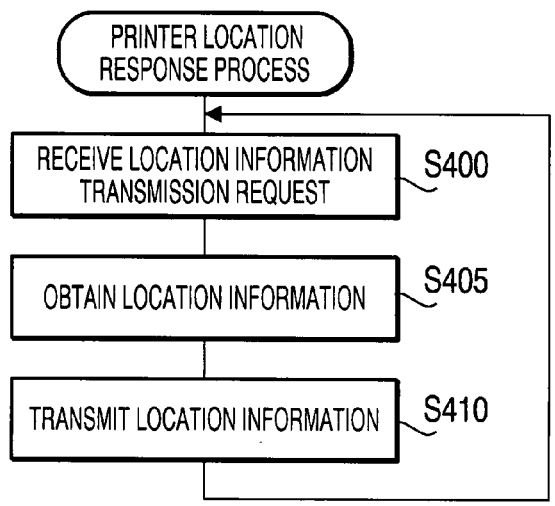
FIG. 12 is a flowchart illustrating a flow of printer location response process in accordance with the first embodiment of the present invention.

Next, FIG. 12 is a flowchart which shows a flow of a printer location response process executed by the control unit 51 of the printer 5. The control unit 51 repeatedly executes this process concurrently with other processes which the control unit 51 should execute.

In the process shown in FIG. 12, first, the location information transmission request is received (S400), then the location information of the printer 5 is obtained from the location calculation unit 54 (S405). Then, the obtained location information is transmitted to the server 3 (S410), and control returns to the above S400. At step S410, the device ID of the printer 5 is transmitted to the server 3 along with the location information.

Figure 13A:
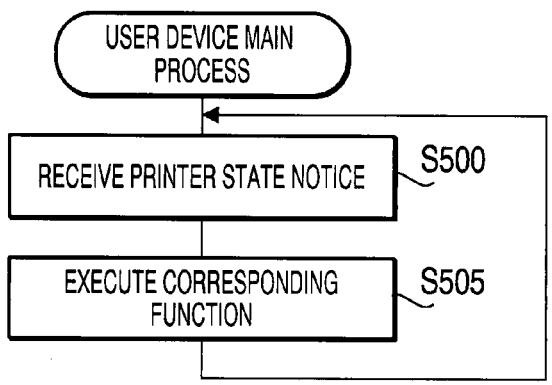
FIG. 13A is a flowchart illustrating a flow of a user device main process.

FIG. 13A is a flowchart which shows a flow of a user device main process executed by the control unit 41 of the user device 4. The control unit 41 repeatedly executes this process concurrently with other processes which the control unit 41 should execute.

In the process shown in FIG. 13A, first, the printer state notice is received from the server 3 (S500). Then, functions which correspond to the notice content of the printer state notice are executed (S505), and such a fact that the closest printer 5 has reached the specific state is noticed to the user who is carrying the user device 4. Then, control returns to S500.

Figure 13B:
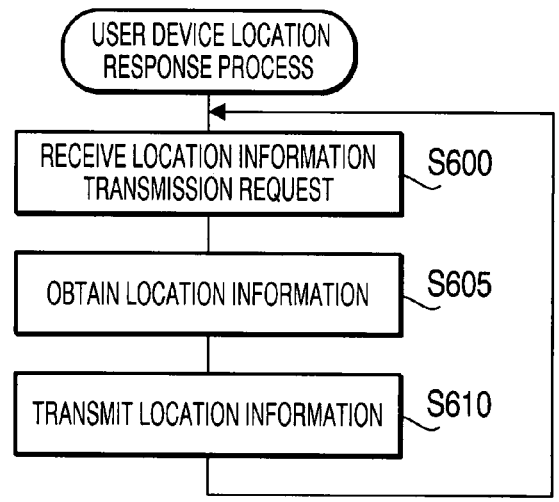
FIG. 13B is a flowchart illustrating a user device location response process in accordance with the first embodiment of the present invention.

FIG. 13B is a flowchart which shows a flow of a user device location response process executed by the control unit 41 of the user device 4. The control unit 41 repeatedly executes this process concurrently with other processes which the control unit 41 should execute.

In the process shown in FIG. 8B, first, the location information transmission request is received from the server 3 (S600), then the location information of the use device 4 is obtained from the location calculation unit 45 (S605). Next, the obtained location information is transmitted to the server 3 (S610). Then, control returns to the above S600. Further, at S610, the device ID of the use device 4 is transmitted to the server 3 along with the location information.

Figure 14:
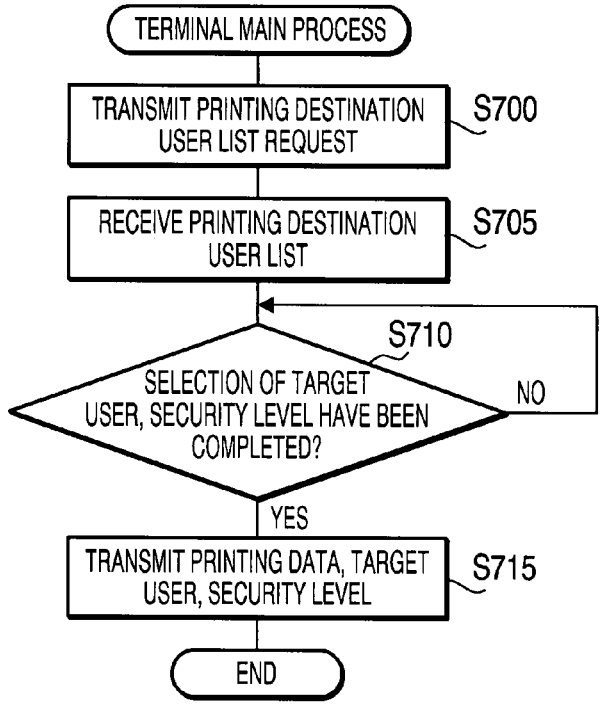
FIG. 14 is a flowchart illustrating a flow of terminal main process in accordance with the first embodiment of the present invention.

FIG. 14 is a flowchart which shows a flow of a terminal main process executed by the control unit 21 of the terminal device 2. Further, when transmission of the printing destination user list request is instructed by user's operations in the input unit 22, the control unit 21 executes this process.

Figure 15:
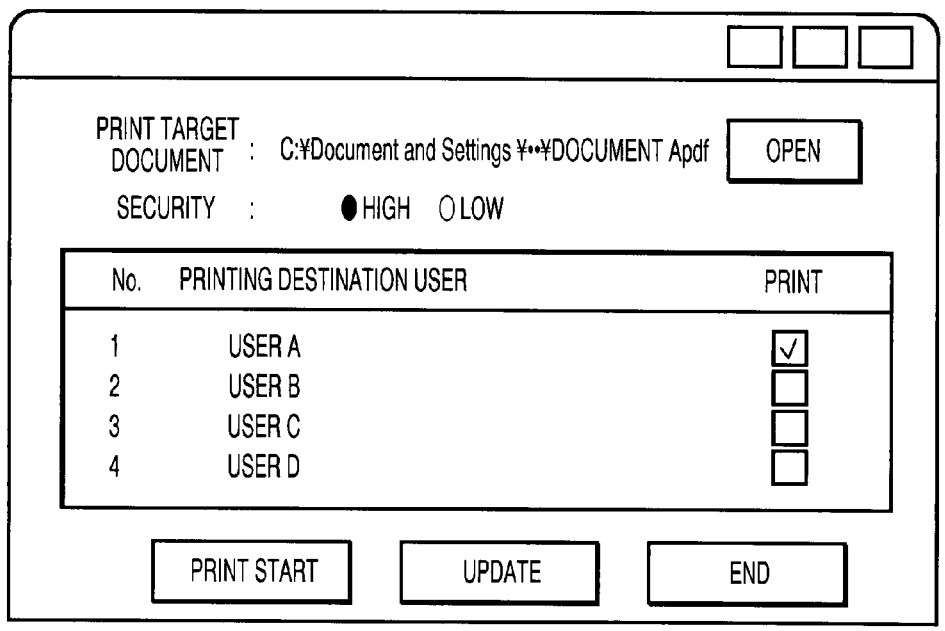
FIG. 15 is an overall drawing of printing destination selection screen.

In the process shown in FIG. 14, first, the printing destination user list request is transmitted to the server 3 (S700), then the printing destination user list is received from the server 3 (S705), and the printing destination selection screen is displayed at the display unit 24. A GUI (Graphical User Interface) is provided on the printing destination selection screen so that the user can execute selection of the target user, selection of the security level, printing start instruction, update instruction of the printing destination user list, the printing termination instruction, etc. (see FIG. 15).

In step S710, the control unit 21 waits until selections of the target user and the security level are completed on the printing destination user list (S710: No). If these selections are completed (S710: Yes), the printing data, the target user, and the security level are transmitted to the server 3, then this process terminates.

As described above, in the data output system 1, when the terminal device 2 selects the user device 4 to which output of the printing data is to be notified, and transmits the printing data to the server 3, the server 3 transmits the printing data to the printer 5 which is closest to the user device 4 selected by the terminal device 2. Then, this printer 5 prints the printing data. When the printing of the printing data reaches the specific state, the printer 5 transmits the target state occurrence notice to the server 3, the server 3 transmits the printer state notice to the user device 4 selected by the terminal device 2 so as to indicate such a fact that the closest printer 5 has reached the specific state to the user who is carrying this user device 4.

Therefore, according to the data output system 1, it is possible to output the printing data on the printer 5 which is closest to the receiver of the printing data. The data output system 1 also enables the receiver to obtain the printing data at the proper timing.

In the data output system 1, because the receiver is carrying the user device 4, even if the receiver moves, the printing data can be outputted to the printer which is closest to the receive, and also the receiver can obtain the printing data at the proper timing.

In the data output system 1, when the number of sheets of paper to be printed for the printing data is less than the first designated number of sheets of paper, and also output of the printing data is immediately completed, because the noticed is issued to the receiver at the beginning of the printing, the receiver is able to immediately obtain the printing data.

In the data output system 1, when the number of sheets of paper to be printed for the printing data is more than the second designated number of sheets of paper, and also it needs much time to complete the output, because the noticed is issued to the receive at end of the printing, it is possible to prevent the receiver from waiting near the printer 5 until the output is complete, and wasting time.

In the data output system 1, when the number of sheets of paper to be printed for the printing data is larger than or equal to the first designated number of sheets of paper, and also is less than the second designated number of sheets of paper, because the noticed is issued when the current number of sheets of paper to be printed has reached the target number of sheets of paper to be printed, the receiver may go to obtain the printing data at the proper timing according to number of sheets of paper to be printed.

In the data output system 1, when the security level is set to "high", because the noticed is issued to the receiver at the beginning of the printing, the receiver is able to immediately obtain the printing data, and it is possible to prevent any other persons from finding the printing data.

Meanwhile, in the first embodiment, the server 3 corresponds to the location information management device of the present invention, the printer 5 corresponds to the data output device of the present invention, the user device 4 corresponds to the communication terminal device of the present invention, and the terminal device 2 corresponds to the information processing device of the present invention.

And, in the first embodiment, S205 of the printing destination user list generation process executed by the control unit 31 of the server 3 corresponds to the output device information receipt unit and the terminal device information receipt unit of the present invention, S215 to S225 of the printing destination user list generation process correspond to the correspondence setting unit of the present invention, and S110 of the server main process corresponds to the terminal identification information transmission unit of the present invention.

And, in the first embodiment, S125 of the server main process corresponds to the first output data receipt unit of the present invention, S170 of the server main process corresponds to the first output data transmission unit of the present invention, S175 of the server main process corresponds to the first state notice receipt unit of the present invention, and S180 of the server main process corresponds to the first state notice transmission unit of the present invention.

And, in the first embodiment, S405 of the printer location response process executed by the control unit 51 of the printer 5 corresponds to the output device location information obtaining unit of the present invention, S410 of the printer location response process corresponds to the output device information transmission unit of the present invention, and S300 of the printer main process executed by the control unit 51 of the printer 5 corresponds to the second output data receipt unit of the present invention.

And, in the first embodiment, the output unit 52 of the printer 5 corresponds to the data output unit of the present invention, and S310 to S325, S340 and S345 of the printer main process correspond to the second state notice transmission unit of the present invention.

And, in the first embodiment, S605 of the user device location response process executed by the control unit 41 of the user device 4 corresponds to the terminal device location information obtaining unit of the present invention, S610 of the user device location response process corresponds to the terminal device location information transmission unit of the present invention, S500 of the user device main process executed by the control unit 41 of the user device 4 corresponds to the second state notice receipt unit of the present invention, and S505 of the user device main process corresponds to the state notice output unit of the present invention.

And, in the first embodiment, S705 of the terminal main process executed by the control unit 21 of the terminal device 2 corresponds to the terminal identification information receipt unit of the present invention, the input unit 22 of the terminal device 2 and GUI of the printing destination selection screen correspond to the selection unit of the present invention, and S715 of the terminal main process corresponds to the second output data transmission unit of the present invention.

And, in the first embodiment, S140 and S150 of the server main process correspond to the amount of data determination unit of the present invention, S140 and S145 of the server main process correspond to the first specific state setting unit of the present invention, S140, S150, S160, and S165 of the server main process correspond to the third specific state setting unit of the present invention, and S150 and S155 of the server main process correspond to the fourth specific state setting unit of the present invention.

And, in the first embodiment, the input unit 22 of the terminal device 2 and GUI of the printing destination selection screen correspond to the secret setting unit of the present invention, and S135 and S145 of the server main process correspond to the fifth specific state setting unit of the present invention.

Second Embodiment

Hereafter, a second embodiment according to the invention will be explained.

The flow of the printing destination user list generation process in the data output system 1 of the above first embodiment is just partially changed in the second embodiment. Therefore, here, only the printing destination user list generation process is described in detail.

Figure 16:
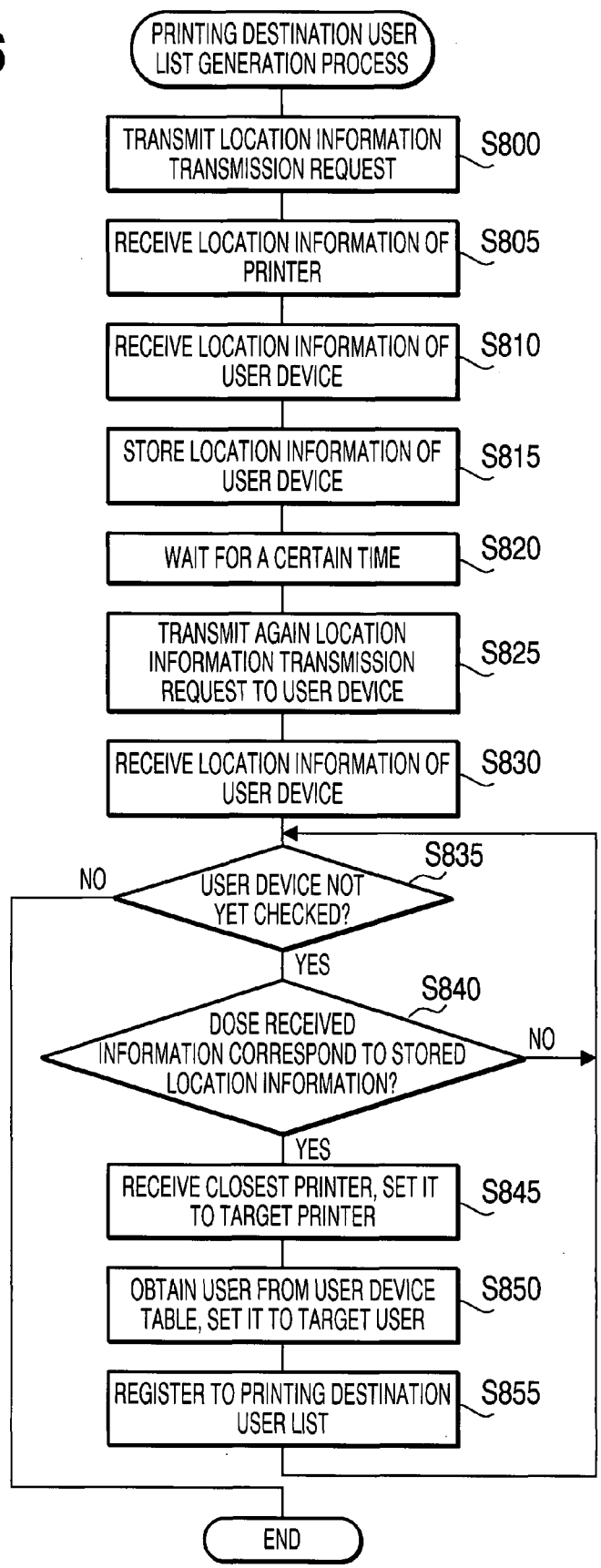
FIG. 16 is a flowchart illustrating a flow of printing destination user list generation process in accordance with the second embodiment of the present invention.

FIG. 16 is a flowchart showing a flow of the printing destination user list generation process in the second embodiment. The printing destination user list generation process is executed under control of the control unit 31 of the server 3.

In the process as shown in FIG. 16, first, the location information transmission request is transmitted to all the printers 5 and all the user devices 4 (S800). After the location information of the printer 5 has been received (S805), the location information of the user device 4 is received (S810). Further, in steps S805 and S810, the device ID of the printer 5 and the device ID of the user device 4 are received along with the location information.

Subsequently, the location information of the user device 4 is stored in the memory unit 32 along with the device ID (S815), the control unit 31 waits for a certain time (e.g. 2 seconds) (S820). Then, the location information transmission request is transmitted to the user device 4 again (S825), and the location information of the user device 4 is received again (S830).

In step S835, the control unit 31 judges whether or not there are any user devices 4 which have not yet been checked at S840 to S855 which will be explained later in the user devices 4 of which location information was received. (S835).

If there are any user devices 4 which have not yet been checked (S835: Yes), regarding one of such user devices 4, the control unit 31 judges whether or not the location information of this user device 4 and the location information stored in the memory unit 32 for this user device 4 are identical with each other (S840) If they are not identical to each other (S840: No), control returns to step S835.

On the other hand, if they are identical to each other (S840: Yes), the printer which is closest to this user device 4 is searched based on this location information and the location information of the printer 5, and the searched printer is set to be a target printer for this user devices 4 (S845).

Then, the name of the user who is carrying this user device 4 is obtained from the above user device table (S850), this name of the user and the device ID of the target printer are associated with each other and registered to the printing destination user list (S855). Then, control returns to step S835. On the other hand, at S835, if there are not any user devices 4 which have not yet been checked (S835: Yes), this process immediately terminates.

As described above, in the data output system 1 according to the second embodiment, the server 3 receives and stores the location information of the user device 4, then it receives the location information of the user device 4 again after a certain time. The user for such a user device 4 that the location information which is received again and the stored location information are not identical with each other is removed from the registration target for the printing destination user list.

Therefore, according to the data output system of the second embodiment, it is possible to prevent output of the printing data for the receiver who is moving or moves frequently.

By the way, in the second embodiment, S600 of the user device location response process corresponds to the terminal location request receipt unit of the present invention, and S605 and S610 of the user device location response process correspond to the operation unit of the present invention.

And, in the second embodiment, S800 and S825 of the printing destination user list generation process correspond to the terminal location request transmission unit of the present invention, S815, S820 and S840 of the printing destination user list generation process correspond to the location change specifying unit of the present invention, and S840 of the printing destination user list generation process corresponds to the exclusion unit of the present invention.

Third Embodiment

Hereafter, a third embodiment according to the invention will be explained.

The process executed by the control unit 31 of the server 3 and the process executed by the control unit 51 of the printer 5 in the data output system 1 of the above first embodiment are just partially changed in the third embodiment.

Therefore, here, only the process executed by the control unit 31 of the server 3 and the process executed by the control unit 51 of the printer 5 will be explained in detail.

Figure 17:
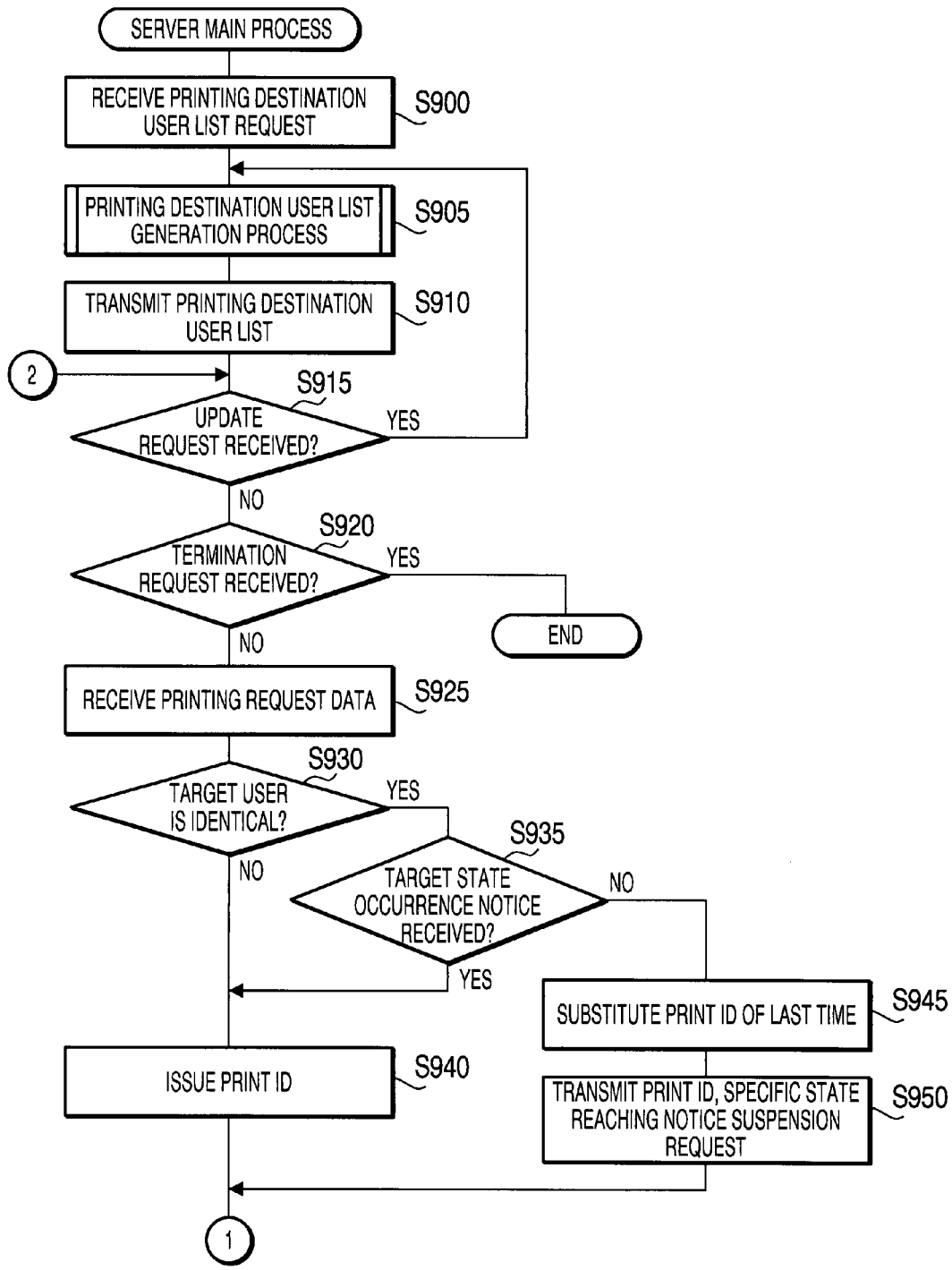
FIG. 17 is a flowchart illustrating a flow of server main process in accordance with the third embodiment of the present invention.
Figure 18:
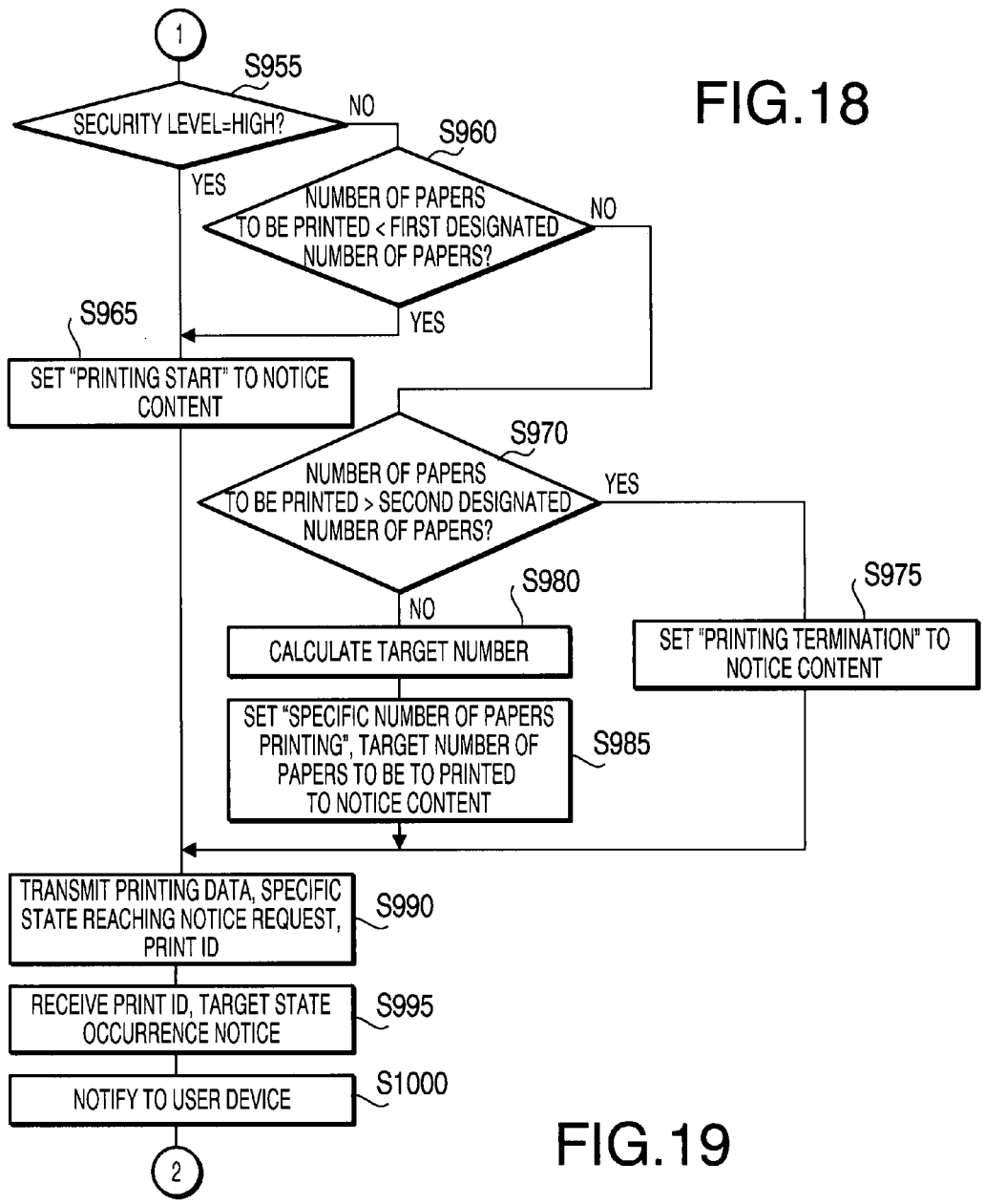
FIG. 18 is a flowchart illustrating a flow of server main process in accordance with the third embodiment of the present invention.

FIGS. 17 and 18 are flowcharts showing a flow of the server main process executed by the control unit 31 of the server 3 in the third embodiment.

In the process as shown in the FIGS. 17 and 18, first, the process which is same as steps S100 to S125 of the server main process in the first embodiment is executed (steps S900 to S925), then the control unit 31 judges whether or not the target user included in the received printing request data is identical with the target user included in the printing request data received at the last time (S930).

If the target users are not identical with each other (S930: No), control proceeds to step S940 which will be explained later. On the other hand, if they are identical (S930: Yes), the control unit 31 judges whether or not the target state occurrence notice for the print ID received at the last time has not been yet received (S935). If the target state occurrence notice has been received (S935: Yes), the new print ID is issued for the printing data received at this time in the same way as S130 of the server main process in the first embodiment (S940). Then, control proceeds to S955 which will be explained later.

On the other hand, if the target state occurrence notice has not yet been received (S935: No), the print ID of the last time is substituted for the print ID issued for the printing data received at this time (S945), and the specific state reaching notice suspension request which requires the printer 5 to suspend transmission of the target state occurrence notice, and the print ID are transmitted to the printer 5 (S950).

Then, the process which is same as steps S135 to 180 of the server main process in the first embodiment is executed (S955 to S1000).

Figure 19:
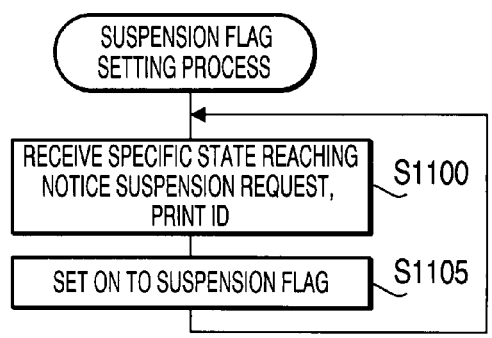
FIG. 19 is a flowchart illustrating a flow of suspension flag setting process in accordance with the third embodiment of the present invention.

FIG. 19 is a flowchart showing a flow of the suspension flag setting process executed by the control unit 51 of the printer 5 in the third embodiment. Meanwhile, the control unit 51 repeatedly executes this process concurrently with other processes which the control unit 51 should execute.

In the process as shown in FIG. 19, first, the specific state reaching notice suspension request and the print ID are received from the server 3 (S1100). Then, regarding this print ID, a suspension flag which shows transmission suspension of the target state occurrence notice is set to ON (i.e. transmission suspension) (S1105). Then, control returns to step S100.

Figure 20:
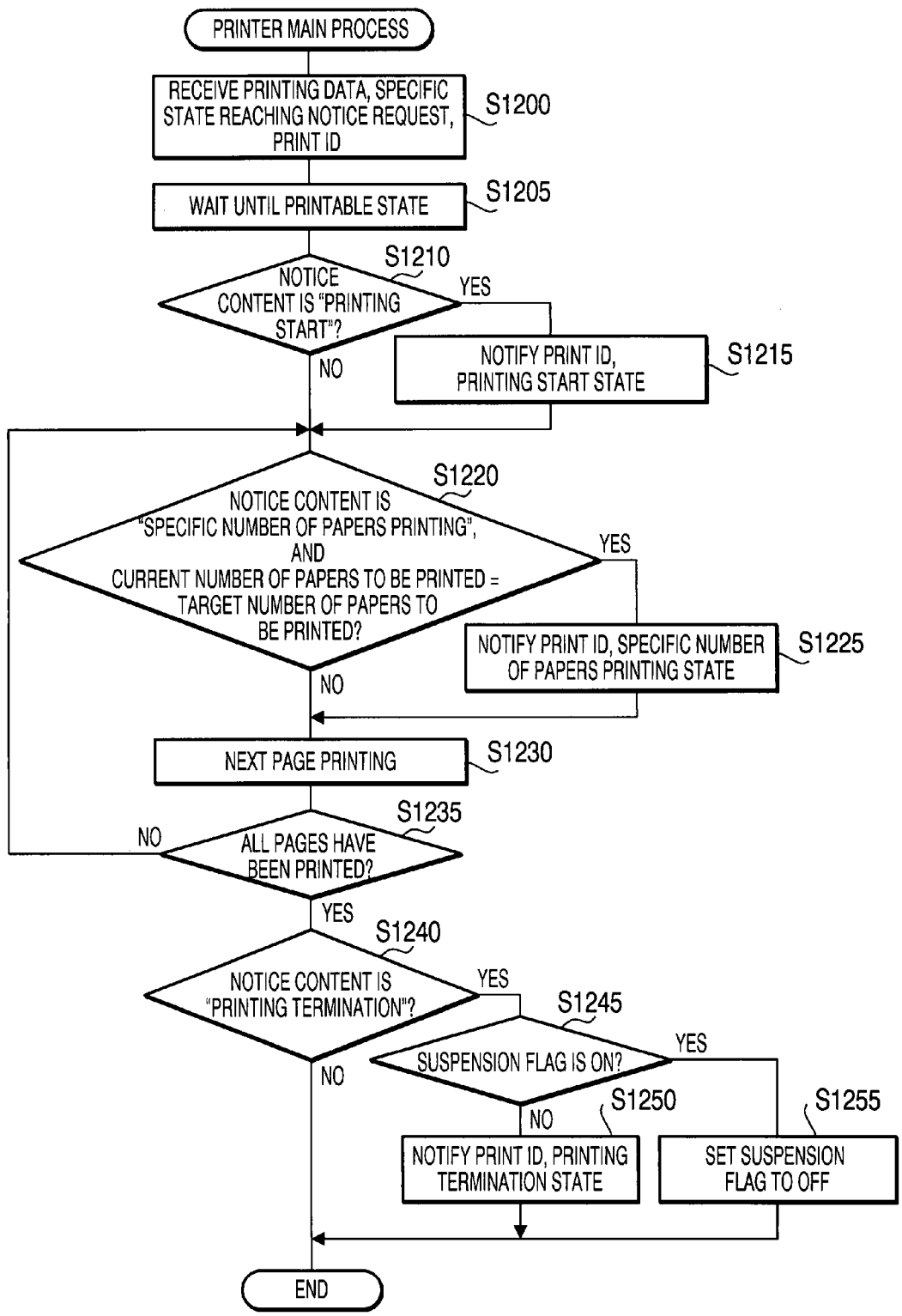
FIG. 20 is a flowchart illustrating a flow of printer main process in accordance with the third embodiment of the present invention.

FIG. 20 is a flowchart of a flow of the printer main process executed by the control unit 51 of the printer 5 in the third embodiment.

In the process as shown in FIG. 20, first, the process which is same as steps S300 to S340 of the printer main process in the first embodiment is executed (steps S1200 to S1240).

Then, at S1240, if the notice content of the specific state reaching notice request is not set to "printing termination" (S1240: No), this process immediately terminates.

On the other hand, if the notice content of the specific state reaching notice request is set to "printing termination" (S1240: Yes), the control unit 51 judges whether or not the suspension flag of the print ID for the printing data of this time is set to ON (S1245).

Here, if the suspension flag is not set to ON (i.e. it is set to OFF) (S1245: No), the target state occurrence notice which shows such a fact that the printing termination has been reached, and the print ID is transmitted to the server 3 in the same way as S345 of the printer main process in the first embodiment (S1250). Then, the printer main process terminates.

On the other hand, if the suspension flag is set to ON (S1245: Yes), the suspension flag of the print ID for the printing data of this time is set to OFF (S1255). Then, the printer main process terminates.

As described above, in the data output system 1 of the third embodiment, when the server 3 transmitted the printing data to the printer 5, and has not yet received the target state occurrence notice from the printer 5, if the new printing data for the identical target user is received, the server 3 causes the printer 5 to suspend to transmit the target state occurrence notice for the printing data of the last time. Then, if the server 3 receives the target state occurrence notice for the printing data of this time, it transmits the printer state notice to the user device 4 of the target user.

Therefore, according to the data output system 1 in the third embodiment, when a plurality of pieces of printing data are subsequently outputted for the identical receiver, because the receiver is noticed when output of the last printing data has been completed, it is possible to prevent this receiver from going repeatedly to obtain the printing data.

In the third embodiment, S1100 of the suspension flag setting process executed by the control unit 51 of the printer 5 corresponds to the suspension request receipt unit of the present invention, and S1245 of the printer main process executed by control unit 51 of the printer 5 corresponds to the notice suspension unit of the present invention.

And, in the third embodiment, S945 of the server main process executed by the control unit 31 of the server 3 corresponds to the output identifier setting unit of the present invention, S930 and S935 of the server main process correspond to the identity determination unit of the present invention, and S950 of the server main process corresponds to the suspension request transmission unit of the present invention.

The embodiments of the present invention have been explained above, however it is apparent that the present invention can be implemented in a variety of embodiments within the technical scope of the present invention without any limitation by the above embodiments in any manner.

For example, the printer which is closest to the target user is set to the target printer in the above embodiments, however, the printer which is located within a certain range may be set to the target printer, other than the closest printer. When a plurality of printers 5 exist within a certain range, the server 3 may be configured to obtain not only the location information but also other printing characteristics (e.g. color, monochrome, printing-capability of coated paper, etc.) for the printers 5, determine the attributes (e.g. color, monochrome, etc.) of the printing data transmitted from the terminal device 2, select the printer 5 having the printing characteristics which satisfies the attributes, and transmit the printing data. In this case, it is possible to output the printing data from the printers 5 corresponding to the location of the target user, and also from the printer 5 which is printable to satisfy the attributes of the printing data.

When no printer 5 exists within a certain range, the server 3 may return the fact to the terminal device 2. Thereby, when the printer 5 which is closest to the target user is located so far that the target user can not quickly go to obtain the printing data, it is possible to prevent the transmitter from executing the printing without knowing the fact, and troubling the target user.

The terminal device 2 and the server 3 are provided individually in the above embodiments, however, the terminal device 2 may serve as the server 3 concurrently.

In the server main process of the above embodiments, when the number of sheets of paper to be printed is more than the first designated number of sheets of paper, it is determined whether or not it is less than the second designated number of sheets of paper, then the notice content of the specific state reaching notice request is set according to this determination result. However, when the number of sheets of paper to be printed is more than the first designated number of sheets of paper, "printing termination" may be set to the notice content of the specific state reaching notice request without determining whether or not it is less than the second designated number of sheets of paper (which corresponds to the second specific state setting unit of the present invention).

In this case, even if the number of sheets of paper to be printed is many, the receiver is able to obtain the printing data at the proper timing according to the number of sheets of paper to be printed. Therefore, it is possible to prevent the receiver from waiting near the printer 5 until the completion of the printing, and wasting the time.

What is claimed is:

1. A location information management device for use with at least one data output device, at least one communication terminal device and at least one information processing device, the location information management device comprising:

an output device information receipt unit which receives output device identification information for identifying the at least one data output device and output device location information which shows a location of the at least one data output device from the at least one data output device;

a terminal device information receipt unit which receives terminal device identification information for identifying the at least one communication terminal device and terminal device location information which shows a location of the at least one communication terminal device from the at least one communication terminal device;

a correspondence setting unit which specifies the at least one data output device having a predetermined location relationship with the at least one communication terminal device based on relation between the output device identification information and the output device location information received by the output device information receipt unit and the terminal device identification information and the terminal device location information received by the terminal device information receipt unit, stores the output device identification information of a specified data output device and the terminal device identification information of a corresponding communication terminal device with which the specified data output device has the predetermined location relationship, in a storage unit, while associating the output device identification information with the terminal device identification information;

a terminal identification information transmission unit which transmits the terminal device identification information stored in the storage unit to the at least one information processing device;

a first output data receipt unit which receives the terminal device identification information and output data to be outputted by a data output device from the information processing device;

a first output data transmission unit which specifies the output device identification information corresponding to the terminal device identification information received by the first output data receipt unit in accordance with the output device identification information and the terminal device identification information associated with each other in the storage unit, and transmits the output data and a specific state notice request designating a specific state which should be notified by the data output device regarding output of the output data, to the data output device indicated by the specified output device identification information;

a first state notice receipt unit which receives a specific state notice indicating that output of the output data has reached the specific state, from the data output device; and a first state notice transmission unit which transmits the specific state notice to a communication terminal device represented by the terminal device identification information received by the first output data receipt unit.

2. The location information management device according to claim 1, further comprising:

an amount of data determination unit which determines an amount of the output data received by the first output data receipt unit; and a first specific state setting unit which sets the specific state designated by the specific state notice request to an output start state of the output data if a determination result of the amount of data determination unit is less than a predetermined first amount of data.

3. The location information management device according to claim 1, further comprising:

an amount of data determination unit which determines an amount of the output data received by the first output data receipt unit; and a second specific state setting unit which sets the specific state designated by the specific state notice request to an output completion state of the output data if the determination result of the amount of data determination unit is more than a predetermined first amount of data.

4. The location information management device according to claim 1, further comprising:

an amount of data determination unit which determines an amount of the output data received by the first output data receipt unit;

a first specific state setting unit which sets the specific state designated by the specific state notice request to an output start state of the output data if a determination result of the amount of data determination unit is less than a predetermined first amount of data;

a third specific state setting unit which sets the specific state designated by the specific state notice request to such a state that an amount of output of the output data has reached a predetermined amount of data if the determination result of the amount of data determination unit is larger than or equal to the first amount of data and is less than a predetermined second amount of data; and a fourth specific state setting unit which sets the specific state designated by the specific state notice request to an output completion state of the output data if the determination result of the amount of data determination unit is larger than or equal to the second amount of data.

5. The location information management device according to claim 1, further comprising:

a fifth specific state setting unit which judges whether the output data received by the first output data receipt unit has been set to be secret, and sets the specific state designated by the specific state notice request to an output start state of the output data if the output data is secret.

6. The location information management device according to claim 1, further comprising:

a terminal location request transmission unit which transmits a terminal location request to the communication terminal device a plurality of times;

a location change specifying unit which specifies the terminal device identification information corresponding to the terminal device location information which changed within a first predetermined time according to the terminal device identification information and the terminal device location information received by the terminal device information receipt unit; and an exclusion unit which excludes the terminal device identification information specified by the location change specifying unit from an storing object to be stored in the storage unit by the correspondence setting unit.

7. The location information management device according to claim 1, further comprising:

an output identifier setting unit which sets an output identifier to the output data to be transmitted by the first output data transmission unit;

an identity determination unit which judges whether or not the terminal device identification information associated with the output device identification information corresponding to a receiver of first output data in the storage unit and the terminal device identification information associated with to the output device identification information corresponding to a receiver of second output data in the storage unit are identical with each other if the first output data transmission unit transmits the second output data before the first state notice receipt unit receives the specific state notice, in response to a fact that the first output data transmission unit transmitted the first output data; and a suspension request transmission unit which transmits the output identifier for output of the first output data and a notice suspension request to the data output device if a determination result of the identity determination unit shows that the terminal device identification information are identical with each other.

8. A data output system, comprising:
a location information management device according to claim 1;
at least one data output device;
at least one communication terminal device; and
at least one information processing device,
wherein the at least one data output device comprises:

a output device location information obtaining unit which obtains the output device location information of the data output device;

a output device information transmission unit which transmits the output device location information obtained by the output device location information obtaining unit and the output device identification information of the data output device to the location information management device;

a second output data receipt unit which receives the output data and the specific state notice request from the location information management device;

a data output unit which outputs the output data received by the second output data receipt unit; and a second state notice transmission unit which transmits the specific state notice to the location information management device in response to a fact that the specific state designated by the specific state notice request received by the second output data receipt unit has been reached regarding output of the output data by the data output unit, wherein the at least one communication terminal device comprises:

a terminal device location information obtaining unit which obtains the terminal device location information of the communication terminal device;

a terminal device information transmission unit which transmits the terminal device location information obtained by the terminal device location information obtaining unit and the terminal device identification information of the communication terminal device to the location information management device;

a second state notice receipt unit which receives the specific state notice from the location information management device; and a state notice output unit which outputs such a fact that the specific state notice has been received by the second state notice receipt unit, wherein the at least one information processing device comprises:

a terminal identification information receipt unit which receives the terminal device identification information from the location information management device;

a selection unit which selects a notice receiver to which output of the output data is notified from the terminal device identification information received by the terminal identification information receipt unit; and a second output data transmission unit which transmits the terminal device identification information of the notice receiver selected by the selection unit and the output data to the location information management device.

9. The data output system according to claim 8, wherein the communication terminal device is installed in a user-portable device.

10. The data output system according to claim 8, wherein the information processing device further comprises a secret setting unit which sets information on whether or not the output data is secret, to the output data.

11. The data output system according to claim 8, wherein the communication terminal device further comprises:

a terminal location request receipt unit which receives terminal location request requiring transmission of the terminal device location information from the location information management device; and an operation unit which operates the terminal device location information obtaining unit and the terminal device information transmission unit in response to receipt of the terminal location request by the terminal location request receipt unit.

12. The data output system according to claim 8, wherein the data output device further comprises:
   a suspension request receipt unit which receives an output identifier identifying output of the output data and a notice suspension request requesting transmission suspension of the specific state notice from the location information management device; and
   a notice suspension unit which causes the second state notice transmission unit to suspend transmission of the specific state notice for output of the output data indicated by the output identifier received by the suspension request receipt unit.

13. A computer readable storage device having computer readable instruction stored thereon, which, when executed by a processor of a location information management device for use with at least one data output device, at least one communication terminal device and at least one information processing device, configures the processor to perform the steps of:
   receiving output device identification information for identifying the at least one data output device and output device location information which shows a location of the at least one data output device from the at least one data output device;
   receiving terminal device identification information for identifying the at least one communication terminal device and terminal device location information which shows a location of the at least one communication terminal device from the at least one communication terminal device;
   specifying the at least one data output device having a predetermined location relationship with the at least one communication terminal device based on relation between the output device identification information and the output device location information, and the terminal device identification information and the terminal device location information;
   storing the output device identification information of a specified data output device and the terminal device identification information of a corresponding communication terminal device with which the specified data output device has the predetermined location relationship, in a storage unit, while associating the output device identification information with the terminal device identification information;
   transmitting the terminal device identification information stored in the storage unit to the at least one information processing device;
   receiving the terminal device identification information and output data to be outputted by a data output device from the information processing device;
   specifying the output device identification information corresponding to the received terminal device identification information in accordance with the output device identification information and the terminal device identification information associated with each other in the storage unit;
   transmitting the output data and a specific state notice request designating a specific state which should be notified by the data output device regarding output of the output data, to the data output device indicated by the specified output device identification information;
   receiving a specific state notice indicating that output of the output data has reached the specific state, from the data output device; and
   transmitting the specific state notice to a communication terminal device represented by the received terminal device identification information.

* * * * *